United States Patent [19]
Tahara et al.

[11] Patent Number: 5,620,812
[45] Date of Patent: Apr. 15, 1997

[54] NON-AQUEOUS ELECTROLYTE SECONDARY BATTERY

[75] Inventors: Kensuke Tahara; Fumiharu Iwasaki; Seiji Yahagi; Akifumi Sakata; Tsugio Sakai; Hideki Ishikawa; Shinichi Takasugi, all of Chiba, Japan

[73] Assignee: Seiko Instruments Inc., Japan

[21] Appl. No.: 511,068

[22] Filed: Aug. 3, 1995

[30] Foreign Application Priority Data

Aug. 4, 1994 [JP] Japan .................................. 6-183816
Nov. 28, 1994 [JP] Japan .................................. 6-293524
Jul. 7, 1995 [JP] Japan .................................. 7-172517

[51] Int. Cl.$^6$ .................................................. H01M 4/52
[52] U.S. Cl. ........................ 429/223; 429/220; 429/224; 429/229
[58] Field of Search .................................. 429/220, 223, 429/229, 224

[56] References Cited

U.S. PATENT DOCUMENTS

| | | | |
|---|---|---|---|
| 5,169,736 | 12/1992 | Bittihn et al. ........................ | 429/223 X |
| 5,264,201 | 11/1993 | Dahn et al. .......................... | 429/223 X |
| 5,286,582 | 2/1994 | Tahara et al. ........................ | 429/218 |
| 5,427,875 | 6/1995 | Yamamoto et al. ................... | 429/223 |
| 5,478,674 | 12/1995 | Miyasaka ............................. | 429/223 X |

*Primary Examiner*—Stephen Kalafut
*Attorney, Agent, or Firm*—Adams & Wilks

[57] ABSTRACT

A non-aqueous electrolyte secondary battery comprises a negative electrode having an active material comprised of lithium or a material capable of absorbing and releasing lithium, a lithium ion conductive non-aqueous electrolyte, and a positive electrode. The positive electrode active material is comprised of a composite represented by composition formula $Li_aR_bL_cM_dO_2$ where R is one or more metalloid elements selected from boron B and silicon Si, L is at least one element selected from metals and metalloids of Groups IIIA and IVA of the periodic table, alkaline earth metals, and metals selected from the group consisting of Ti, Mn, Cu and Zn, M represents transition metal elements comprising at least Ni and Co, R, L and M are different, and a, b, c and d satisfy $0 < a \leq 1.15$, $0.85 \leq b+c+d \leq 1.3$, $0 < b+c \leq 0.5$, $0 < b$ and $0 \leq c$.

14 Claims, 12 Drawing Sheets

1: NEGATIVE ELECTRODE CASE
2: NEGATIVE ELECTRODE COLLECTOR
3: NEGATIVE ELECTRODE
4: SEPARATOR
5: POSITIVE ELECTRODE
6: POSITIVE ELECTRODE COLLECTOR
7: POSITIVE ELECTRODE CASE
8: GASKET

1: NEGATIVE ELECTRODE CASE
2: NEGATIVE ELECTRODE COLLECTOR
3: NEGATIVE ELECTRODE
4: SEPARATOR
5: POSITIVE ELECTRODE
6: POSITIVE ELECTRODE COLLECTOR
7: POSITIVE ELECTRODE CASE
8: GASKET

NON-AQUEOUS ELECTROLYTE SECONDARY BATTERY

BACKGROUND OF THE INVENTION

1. Field of the Invention

This invention relates to a non-aqueous electrolyte secondary battery having lithium or a material capable of absorbing and releasing lithium as a negative electrode active material and using a non-aqueous electrolyte conductive to lithium ions, and particularly to an improvement of the positive electrode thereof.

2. Description of the Related Art

In recent years, along with a marked proliferation of portable electronic equipment and communications devices, various devices requiring batteries with high current outputs as power supplies have appeared, and from the points of view of economy and downsizing and downweighting of these devices, high energy density secondary batteries are being demanded. As a result of this, research and development of non-aqueous electrolyte secondary batteries having high voltages and high energy densities have been being carried out intensively, and some such batteries have been put into practical use.

In the past, as positive electrode active materials used in this kind of secondary battery, various materials, such as metal chalcogenides such as $TiS_2$, $MoS_2$ and $NbSe_3$ and metal oxides such as $MnO_2$, $MoO_3$, $V_2O_5$, $Li_xCoO_2$, $Li_x\text{-}NiO_2$ and $Li_xMn_2O_4$, have been proposed.

Among these positive electrode active materials, lithium transition metal oxides $Li_xM_yO_2$ ($x \leq 1$, $y \approx 1$) such as $Li_xCoO_2$ and $Li_xNiO_2$ having $\alpha$-$NaCrO_2$-type layer-like structures undergo a battery reaction with a lithium negative electrode expressed by the following formula (1):

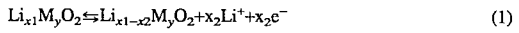

(where $x_1$ is the amount x of Li before charging, $x_2$ is the amount x of Li after charging, $0 < x_1 \leq 1$ and $0 < x_1 - x_2 \leq 1$), and the operating voltage thereof is a high voltage of over 4V. Also, when by charging in the range x=0 to 1 Li ions are made able to deintercalate and intercalate, these materials offer high theoretical energy densities of over 1100 whr/kg, and are therefore considered promising (Japanese Laid-Open Patent Publication No. S.55-136131).

However, there has been the problem that in a battery having lithium or a material capable of absorbing and releasing lithium as a negative electrode active material and a conventional $Li_xM_yO_2$ of the kind described above as a positive electrode active material, at practical charge/discharge voltages and current densities the effective charge/discharge capacity is small, at less than 50% of the theoretical capacity, and the greater the current is the smaller the capacity becomes. Also, there has been the problem that the reduction in operating voltage during discharging due to polarization is large.

The reason for this is that because along with Li ions being drawn out (deintercalation) of the $Li_xM_yO_2$ of the positive electrode by charging the electrode potential of the $Li_xM_yO_2$ increases markedly and also because polarization due to the fact that the Li ion conductivity and electron conductivity are low is great the charging voltage markedly increases, and consequently at practically stable voltages below the decomposition potentials (about 4 to 4.5V with respect to metallic lithium) of electrolytes, which will be further discussed later, which can be used in these batteries and the oxidization potential of the battery case and collectors and the like, the chargeable capacity falls markedly. In particular, when the amount x of Li in the $Li_xM_yO_2$ is in the region below about 0.6 the increase in potential is marked and at practical charging voltages and current densities this region essentially cannot be used.

Also, there has been the problem that because during charging crystal lattices undergo structural changes such as expansion and contraction and phase change, the crystal structure is destroyed by repeated charging and discharging and the charge/discharge capacity gradually falls.

To resolve these problems, the use of [1] a composite oxide $A_xM_yN_zO_2$ (where $0.05 \leq x \leq 1.10$, $0.85 \leq y \leq 1.0$, $0.001 \leq z \leq 0.10$; Japanese Laid-Open Patent Publication No. S.62-90863) of a metal N such as Al, In or Sn and a transition metal M and an alkali metal A, and [2] a composite oxide $Li_yNi_xCo_{1-x}O_2$ (where $0 < x \leq 0.75$, $y \leq 1$; Japanese Laid-Open Patent Publication No. S.63-299056) and the like has been proposed.

By the use of these composite oxides, the charge/discharge characteristics are considerably improved; however, they still fall far short of theoretical capacities, and in particular charge/discharge capacities at the high currents necessary in practice have been low and inadequate.

To solve the above kinds of problem, the present inventors have already proposed the use of [3] a composite oxide $Li_xM_yL_zO_2$ (where $0 < x \leq 1.15$, $0.85 \leq y+z \leq 1.3$, $0 < z$; Japanese Laid-Open Patent Publication No. H.5-54889) of one or more elements L chosen from among the periodic table IIIA, IVA and VA group non-metal elements and semi-metal elements, alkaline earth metal elements and metals selected from the group consisting of Zn, Cu, Ti, with a transition metal M and lithium Li. By the use of this kind of composite oxide, charge/discharge characteristics were further improved; however, there has still been room for improvement of charge/discharge characteristics at high current densities as compared to theoretical capacities.

Also, as the transition metal M, the charge/discharge characteristics are particularly good in the cases of Co and Ni and therefore the use of these metals is preferable, but in the case of Co the potential is essentially high, and especially in the charging region above 50% of the theoretical capacity the potential rises markedly and consequently there is decomposition of the electrolyte and change in the crystal structure, and it has in practice been very difficult to obtain a charge/discharge capacity of over 60% of the theoretical capacity stably. Furthermore, there is the drawback that Co resources are limited and its cost is high. In the case of Ni, on the other hand, charging and discharging to over 80% of the theoretical capacity is possible; however, there are the drawbacks that reduction in charge/discharge capacity (cycle deterioration) caused by repeated charging and discharging is great and deterioration with time is also great. Also, there has been the shortcoming that when thermal synthesis is carried out, which will be further discussed later, synthesis in air is difficult because cubic crystal structures of low charging/discharging performance tend to be produced, and it is necessary to carry out synthesis in an oxygen atmosphere and finely control the atmosphere and the temperature, which makes the manufacturing process complicated and increases costs.

SUMMARY OF THE INVENTION

This invention provides a non-aqueous electrolyte secondary battery comprising a negative electrode whose active material is lithium or a material capable of absorbing and releasing lithium, a non-aqueous electrolyte conductive to lithium ions and a positive electrode, wherein is used as a positive electrode active material a composite oxide expressed by the composition formula $Li_aR_bL_cM_dO_2$ (where R is one or more metalloid elements chosen from boron B and silicon Si; L is at least one element chosen from the group consisting of metals and metalloids of the periodic table IIIA group and IVA group, alkali earth metals and metals selected from the group consisting of Ti, Mn, Cu and Zn; M is one or more transition metal elements; R, L and M are different; and a, b, c and d are in the ranges $0<a\leq1.15$, $0.85\leq b+c+d\leq1.3$, $0<b+c\leq0.5$, $0<b$ and $0<c$, or $c=0$ and at least both nickel Ni and cobalt Co are present as transition metals M).

To solve the kinds of problem described above, as a positive electrode active material for this kind of battery this invention proposes the use of a new composite oxide expressed by the composition formula $Li_aR_bL_cM_dO_2$ (where R is one or more metalloid elements chosen from among boron B and silicon Si; L is at least one element chosen from among metals and metalloids of the periodic table IIIA and IVA groups, alkali earth metals, and metals selected from the group consisting of Ti, Mn, Cu and Zn; M is one or more transition metals; R, L and M are different; and a, b, c and d are in the ranges $0<a\leq1.15$, $0.85\leq b+c+d\leq1.3$, $0<b+c\leq0.5$, $0<b$ and $0<c$, or $c=0$ and at least both nickel Ni and cobalt Co are contained as transition metals M). That is, the use of a composite oxide containing at least lithium Li, a transition metal M and one or more elements R chosen from the non-transition metals (metalloids) boron B and silicon Si and further containing one or more elements L chosen from among metals and metalloids such as Al, Ga, In, Tl and B of the periodic table IIIA group, C, Ge, Sn, Pb and Si of the IVB group, alkaline earth metals such as Be, Mg, Ca, Sr, Ba and Ra, and metals selected from the group consisting of Ti, Mn, Cu and Zn; or a composite oxide containing a metalloid element R consisting of at least B and/or Si and containing both Ni and Co as transition metals M.

The composite oxide $Li_aR_bL_cM_dO_2$ comprising lithium, an element R, an element L and a transition metal M used as the positive electrode active material of the battery of this invention can be synthesized in the following way: Lithium, the transition metal M, the element R and the element L in uncombined form or in compounds such as oxides or hydroxides or salts such as carbonates or nitrates, or halides, nitrides or sulfides are mixed in predetermined ratios and thermally baked in air or another atmosphere containing oxygen at a temperature over 600° C. and preferably between 700° and 900° C. When, as the starting materials of the Li, R, L and M, their oxides or compounds containing oxygen are used, it is also possible to thermally synthesize the composite oxide in an inert atmosphere. In particular, when the transition metal M is mainly Ni an oxidizing atmosphere consisting mainly of oxygen is preferable, and when it is mainly Mn a non-oxidizing atmosphere such as an inert gas is preferable. As for the heating time, 4 to 50 hours is usually sufficient, but to promote the synthesis reaction and increase uniformity it is effective to repeat the process of baking, cooling and grinding-mixing several times.

In the above-mentioned thermal synthesis, as the amount 'a' of Li in the composite oxide $Li_aR_bL_cM_dO_2$ a constant ratio composition $a=1$ or $0.5$ is standard, but a non-constant ratio composition of about $\pm15\%$ is also possible; also, by electrochemical intercalation and deintercalation or the like, $0<a\leq1.15$ is possible. Amounts b, c and d of the element R, the element L and the transition metal M respectively which satisfy $0.85\leq b+c+d\leq1.3$ produce marked effects of improving charge/discharge characteristics and cycle characteristics and are therefore preferable. On the other hand, if the amount b of the element R and the amount c of the element L are too great the charge/discharge capacity of each cycle actually falls; the charge/discharge capacity is maximum in the range $0<b+c\leq0.5$, and this range is therefore preferable.

As the element L, the charge/discharge characteristics and cycle characteristics are particularly good when among the elements mentioned above Mg, C, Si, Ti, Mn, Cu and/or Zn are used, and these are therefore preferable.

As the transition metal M, CO, Ni, Fe, Mn, Cr and V and the like are preferable, and because they produce excellent charge/discharge characteristics Co and Ni are particularly preferable. M does not have to be a single transition metal and may be a mixture of two or more transition metals.

In particular, in the case of a composite oxide $Li_aR_bL_cNi_eCo_fO_2$ containing both Ni and Co as transition metals M, these work together with the element R and the element L and there are the benefits that the charge/discharge characteristics and cycle characteristics improve, even when Ni is the main component, synthesis in air is easy, atmosphere and temperature control during manufacture are easy and manufacturing costs can be reduced. In this case, when more preferably Ni is the main component and the composition ratio of Ni and Co is in the range $0.01\leq f/(e+f)\leq0.5$ and the contained amounts of the element R and the element L are in the ranges $0.01\leq b\leq0.25$ and $0\leq c\leq0.25$, cycle deterioration and deterioration with time of the battery are low and the battery is stable, the charge/discharge capacity is large and the charge/discharge characteristics are excellent. In particular, when the composition ratio of Ni and Co is $0.03\leq f/(e+f)\leq0.25$ and the contained amounts of the element R and the element L are in the ranges $0.01\leq b\leq0.1$ and $0\leq c\leq0.1$, the charge/discharge capacity is especially large and the charge/discharge characteristics and the cycle characteristics are excellent, and this composition is therefore particularly preferable.

As the electrolyte, any non-aqueous electrolyte conductive to lithium ions can be used, for example a non-aqueous (organic) electrolyte consisting of a lithium ion dissociating salt such as $LiClO_4$, $LiPF_6$, $LiBF_4$, $LiCF_3SO_3$ or $Li(CF_3SO_2)_2N$ dissolved as a supporting electrolyte in one organic solvent or a mixture of organic solvents such as γ-butyrolactone, propylene carbonate, ethylene carbonate, butylene carbonate, dimethyl carbonate, diethyl carbonate, ethyl methyl carbonate, (methyl) formate, 1,2-dimethoxyethane, tetrahydrofuran, dioxolan, dimethyl formamide or the like; a polymeric solid electrolyte consisting of an above-mentioned lithium salt solidly dissolved in a polymer such as polyethylene oxide, crosslinked polyphosphazene or the like; or an inorganic solid electrolyte such as $Li_3N$ or LiI.

When a transition metal composite oxide $Li_aR_bL_cM_dO_2$ according to the invention containing an element R chosen from boron and silicon and an element L is used as a positive electrode active material, compared to when $Li_xM_yO_2$ or a composite oxide $Li_aR_bM_dO_2$ containing only boron or silicon or a composite oxide $Li_aL_cM_dO_2$ containing only an element L is used, the range over which Li intercalation and deintercalation are possible at practical charge/discharge voltages and current densities below the decomposition voltage of the electrolyte and the oxidation potentials of the case and the collector and the like, i.e. the effective charge/discharge capacity, increases markedly. Also, because the polarization (the internal resistance) of a battery in which this composite oxide is used decreases, voltage increase during charging and operation voltage decrease during discharging are markedly alleviated and charging and discharging at higher currents are possible. Furthermore, cycle deterioration such as reduction in charge/discharge capacity and increase in battery internal resistance caused by repeated charging and discharging is markedly reduced, and the charge/discharge cycle characteristics are markedly improved.

The reason why the charge/discharge characteristics are improved in this way is not absolutely clear, but may be as follows: The basic crystal structure of the new composite oxide $Li_aR_bL_cM_dO_2$ of the invention resembles the $\alpha$-$NaCrO_2$ structure of an $\alpha$-$NaCrO_2$ type layer-like compound $Li_xM_yO_2$ with some of the transition metal element M thereof replaced by the element R (boron or silicon) and the element L. However, the element R and the element L can also exist in spaces between the crystal lattices and at Li sites (replacing Li). In whichever case, it is likely that the coexistence of the element R and the element L changes the crystal skeleton structure and electron state and compared to when R or L is present on its own the Li ion conductivity is increased, the crystal skeleton structure becomes more stable with respect to the entering and exiting of Li ions, and as a result deintercalation and intercalation of Li ions during charging and discharging becomes easy and there is almost no deterioration such as crystal destruction.

DETAILED DESCRIPTION OF THE PREFERRED EMBODIMENTS

The invention will now be described in further detail with reference to preferred embodiments thereof.

Figure 1:
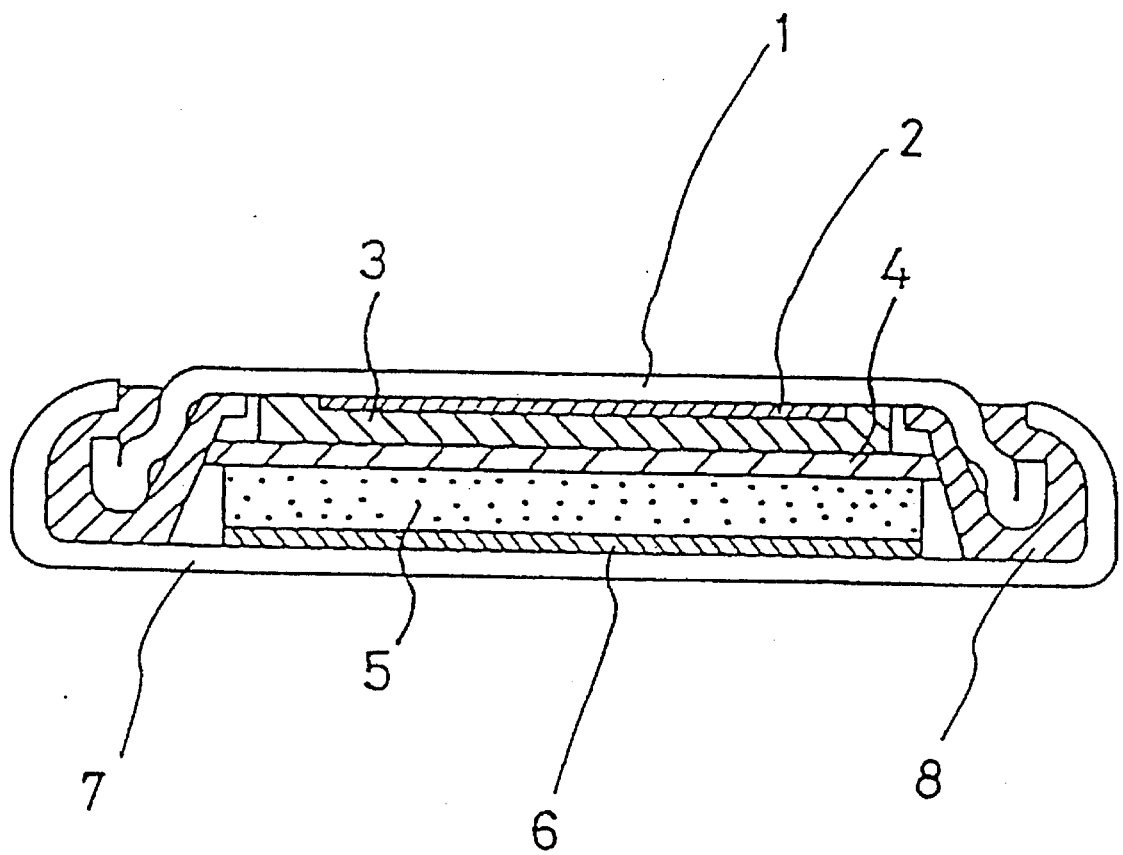
FIG. 1 is a view illustrating an example of a structure of a battery according to the invention.

FIG. 1 is a sectional view of an example of a coin-type battery according to the invention. In FIG. 1, reference numeral 1 denotes a negative electrode case doubling as a negative electrode terminal made by drawing a stainless steel plate plated with nickel on its outer side. Reference numeral 2 denotes a negative electrode collector consisting of a stainless steel net spot-welded to the negative electrode case 1. A negative electrode 3 of diameter 15 mm punched out of an aluminum sheet of a prescribed thickness is fixed to the negative electrode collector 2 and has a lithium foil disc of diameter 14 mm punched out of a lithium foil of a prescribed thickness pressure-fixed thereon. Reference numeral 7 denotes a stainless steel positive electrode case plated with nickel on its outer side and doubling as a positive electrode terminal. Reference numeral 5 denotes a positive electrode pertaining to the invention which will be further discussed later, and 6 is a positive electrode collector consisting of a conducting adhesive (or a conducting paste or the like) having a stainless steel net or carbon as a conducting filler and electrically connecting the positive electrode 5 to the positive electrode case 7.

Reference numeral 4 denotes a separator consisting of a porous film of polypropylene steeped in electrolyte solution. Reference numeral 8 denotes a mainly polypropylene gasket interposed between the negative electrode case 1 and the positive electrode case 7 which maintains electrical insulation between the positive electrode and the negative electrode and also seals in the contents of the battery by the edge of the opening of the positive electrode case being bent inward and caulked therearound. The diameter of the battery is 20 mm and the thickness is 1.6 mm.

First Preferred Embodiment

A positive electrode 5 of this preferred embodiment was made in the following way: Lithium hydroxide $LiOH.H_2O$, boron oxide $B_2O_3$, magnesium oxide MgO and cobalt carbonate $CoCO_3$ were weighed out in the mole ratio Li:B:Mg:Co=1:0.1:0.1:0.8 and well mixed using a mortar; this mixture was then baked by heating for 12 hours in air at a temperature of 850° C., cooled, and ground to a powder of particle diameter of below 53 μm. By repeating this baking and grinding twice, a positive electrode active material $LiB_{0.1}Mg_{0.1}Co_{0.8}O_2$ (hereinafter abbreviated to p1) according to the invention was synthesized. Also, for comparison, a conventional layer-like oxide $LiCoO_2$ (comparison active material r1) containing no boron B or magnesium Mg, a composite oxide $LiB_{0.2}Co_{0.8}O_2$ (comparison active material r2) containing boron B but not containing magnesium Mg, and a composite oxide $LiMg_{0.2}Co_{0.8}O_2$ (comparison active material r3) containing magnesium Mg but not containing boron B were prepared in the following way: $LiOH.H_2O$ and $CoCO_3$ or $LiOH.H_2O$ and $CoCO_3$ and $B_2O_3$ or MgO or the like were weighed out and mixed so that Li:B:Mg:Co were in the mole ratios of the above-mentioned composition formulae, and comparison active materials r1 to r3 were obtained from these mixtures in the same way as the above-mentioned active material p1.

For each of these product materials, the product material as a positive electrode active material, graphite as a conducting agent and fluorine resin or the like as a binding agent were mixed in the weight ratio 60:35:5 to produce a positive electrode mixture and a positive electrode 5 was made by pressure-molding this positive electrode mixture at 2 tons/cm$^2$ into a pellet of diameter 15 mm, thickness 0.5 mm. After that, the positive electrode 5 thus obtained was adhered to and thereby integrated with a positive electrode case 7 using a positive electrode collector 6 made of a conducting resin adhesive with carbon as a conducting filler, and this was dried by reduced-pressure heating at 200° C. for 10 hours to form the positive electrode structure of the battery described above.

For the electrolyte of the batteries, lithium phosphate hexafluoride LiPF$_6$ dissolved 1 mol/l in a solvent consisting of a 1:1 by volume mixture of ethylene carbonate and ethyl methyl carbonate was used.

Each battery made in this way was left to age for one week at room temperature and then a charge/discharge test which will be further discussed later was carried out. Because alloying of the lithium-aluminum laminated negative electrode 3 caused by contact inside the battery with the non-aqueous electrolyte progressed well and the lithium foil became substantially all Li-Al alloy as a result of this aging, the battery voltage stabilized at a value 0.4V less than in a case where metallic lithium is used on its own as the negative electrode.

The batteries thus produced will hereinafter be referred to as batteries P1 and R1 to R3 in correspondence with the positive electrode active materials p1 and r1 to r3 used therein.

Figure 2:
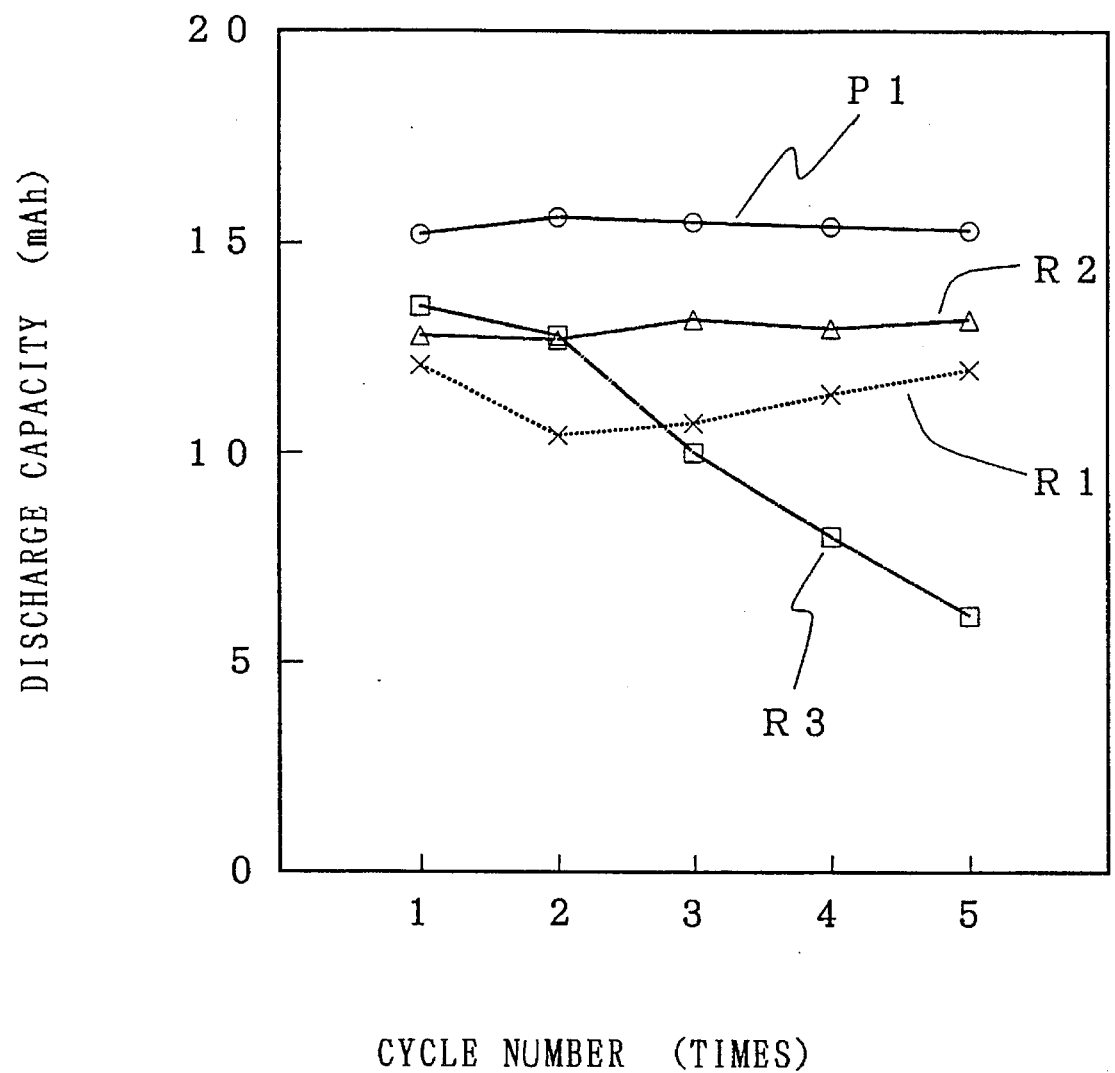
FIG. 2 is a graph comparing the cycle characteristics of batteries in which positive electrode active materials containing B and Mg are and are not used.

The discharge capacities (cycle characteristics) in successive cycles of these batteries P1, R1 to R3 when they were put through charge/discharge cycles with the conditions of a fixed current of 1 mA and a charging final voltage of 4.0V and a discharging final voltage of 2.0V are shown in FIG. 2. The charge/discharge cycles started from charging. As can be seen clearly in FIG. 2, the battery P1 according to the invention had markedly greater discharge capacity than the comparison batteries R1 to R3. Also, the reduction in discharge capacity (cycle deterioration) accompanying repeated charging and discharging was much smaller in the case of the battery P1 of the invention. Furthermore, from charge voltages and discharge voltages measured at the same time it was found that with the battery P1 of the invention although the charge voltage was low over the whole charge/discharge region the discharge operation voltage was reversely markedly high, the polarization (internal resistance) of the battery was greatly improved and high-current charging/discharging was easy.

Second Preferred Embodiment

This preferred embodiment is a case where cobalt Co was used as a transition metal element M, boron B as a compounding element R and manganese Mn as a compounding element L constituting a positive electrode active material.

The positive electrode active material of this preferred embodiment was made in the following way: Lithium hydroxide LiOH.H$_2$O, boron oxide B$_2$O$_3$, manganese dioxide MnO$_2$ and cobalt carbonate CoCO$_3$ were weighed out in the mole ratio Li:B:Mn:Co =1:0.1:0.1:0.8 and well mixed using a mortar; this mixture was then baked by heating for 12 hours in air at a temperature of 850° C., cooled, and ground to a powder of particle diameter of below 53 μm. By repeating this baking and grinding twice, a positive electrode active material LiB$_{0.1}$Mn$_{0.1}$Co$_{0.8}$O$_2$ (hereinafter abbreviated to p2) according to the invention was synthesized. Also, for comparison, a composite oxide LiMn$_{0.2}$Co$_{0.8}$O$_2$ (comparison active material r4) containing magnesium Mn but not containing boron B was prepared in the following way: LiOH.H$_2$O, MnO$_2$ and CoCO$_3$ were weighed out and mixed in the mole ratio Li:Mn:Co= 1:0.2:0.8, and a comparison active material r4 was obtained from this mixture in the same way as the above-mentioned active material p2.

Using these product materials as positive electrode active materials, batteries similar to those of the first preferred embodiment were made in exactly the same way as in the first preferred embodiment. The batteries thus produced will hereinafter be referred to as batteries P2 and R4 in correspondence with the positive electrode active materials p2 and r4 used therein.

Figure 3:
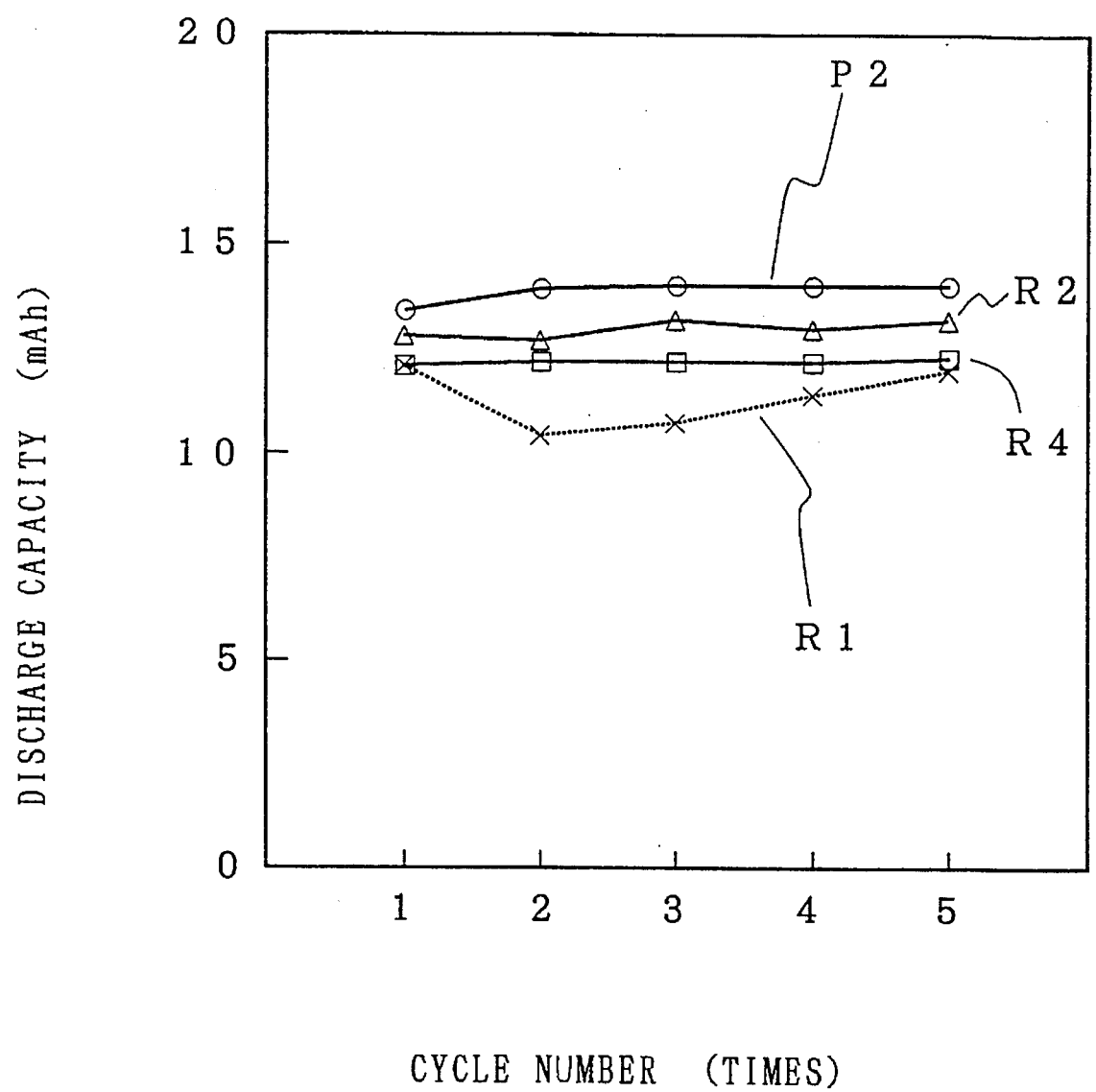
FIG. 3 is a graph comparing the cycle characteristics of batteries in which positive electrode active materials containing B and Mn are and are not used.

These batteries were also put through 1 mA fixed-current charge/discharge cycles the same as those described in connection with the first preferred embodiment. Their discharge capacities (cycle characteristics) in successive cycles are shown in FIG. 3. As is clear from FIG. 3, in this preferred embodiment also the battery P2 according to the invention had markedly greater discharge capacity than the comparison battery R4 in which a positive electrode active material containing only Mn as a compounding element was used, the comparison battery R2 in which a positive electrode active material containing only boron B was used and the comparison battery R1 in which a positive electrode active material containing neither Mn nor boron B was used. Also, the reduction in discharge capacity (cycle deterioration) accompanying repeated charging and discharging was much smaller in the case of the battery P2 of the invention. Furthermore, from charge voltages and discharge voltages measured at the same time it was found that with the battery P2 of the invention although the charge voltage was low over the whole charge/discharge region the discharge operation voltage was reversely markedly high, the polarization (internal resistance) of the battery was greatly improved and high-current charging/discharging was easy.

Third Preferred Embodiment

This preferred embodiment is a case where cobalt Co was used as a transition metal element M, boron B as a compounding element R and silicon Si as a compounding element L constituting a positive electrode active material.

A positive electrode 5 of this preferred embodiment was made in the following way: Lithium hydroxide LiOH.H$_2$O, boron oxide B$_2$O$_3$, silicon dioxide SiO$_2$ and cobalt carbonate CoCO$_3$ were weighed out in the mole ratio Li:B:Si:Co= 1:0.05:0.05:0.9 and well mixed using a mortar; this mixture was then baked by heating for 12 hours in air at a temperature of 850° C., cooled, and ground to a powder of particle diameter of below 53 μm. By repeating this baking and grinding twice, a positive electrode active material LiB$_{0.05}$Si$_{0.05}$Co$_{0.9}$O$_2$ (hereinafter abbreviated to p3) according to the invention was synthesized. Also, for comparison, a conventional layer-like oxide LiCoO$_2$ (comparison active material r5) containing no boron B or silicon Si, a composite oxide LiB$_{0.1}$Co$_{0.9}$O$_2$ (comparison active material r6) containing boron B but not containing silicon Si, and a composite oxide LiSi$_{0.1}$Co$_{0.9}$O$_2$ (comparison active material r7) containing silicon Si but not containing boron B were prepared in the following way: LiOH.H$_2$O and CoCO$_3$ or LiOH.H$_2$O and CoCO$_3$ and B$_2$O$_3$ or SiO$_2$ were weighed out and mixed so that Li:B:Si:Co were in the mole ratios of the above-mentioned composition formulae, and comparison active materials r5 to r7 were obtained from these mixtures in the same way as the above-mentioned active material p3.

For each of these product materials, the product material as a positive electrode active material, graphite as a conductor and fluorine resin or the like as a binding agent were mixed in the weight ratio 60:35:5 to produce a positive electrode mixture, and a positive electrode was then made by pressure-molding this positive electrode mixture together with a positive electrode collector 6 made of a stainless steel net at 2 tons/cm$^2$ into a pellet of diameter 15 mm, thickness 0.5 mm and drying this by reduced-pressure heating at 100° C. for 10 hours.

For the electrolyte of the battery, lithium perchlorate $LiClO_4$ dissolved 1 mol/l in a solvent consisting of a 1:1:2 by volume mixture of propylene carbonate, ethylene carbonate and 1,2-dimethoxy ethane was used.

Using these product materials as positive electrode active materials, batteries similar to those of the first preferred embodiment were made in exactly the same way as in the first preferred embodiment. The batteries thus produced will hereinafter be referred to as batteries P3 and R5 to R7 in correspondence with the positive electrode active materials p3 and r5 to r7 used therein.

Figure 4:
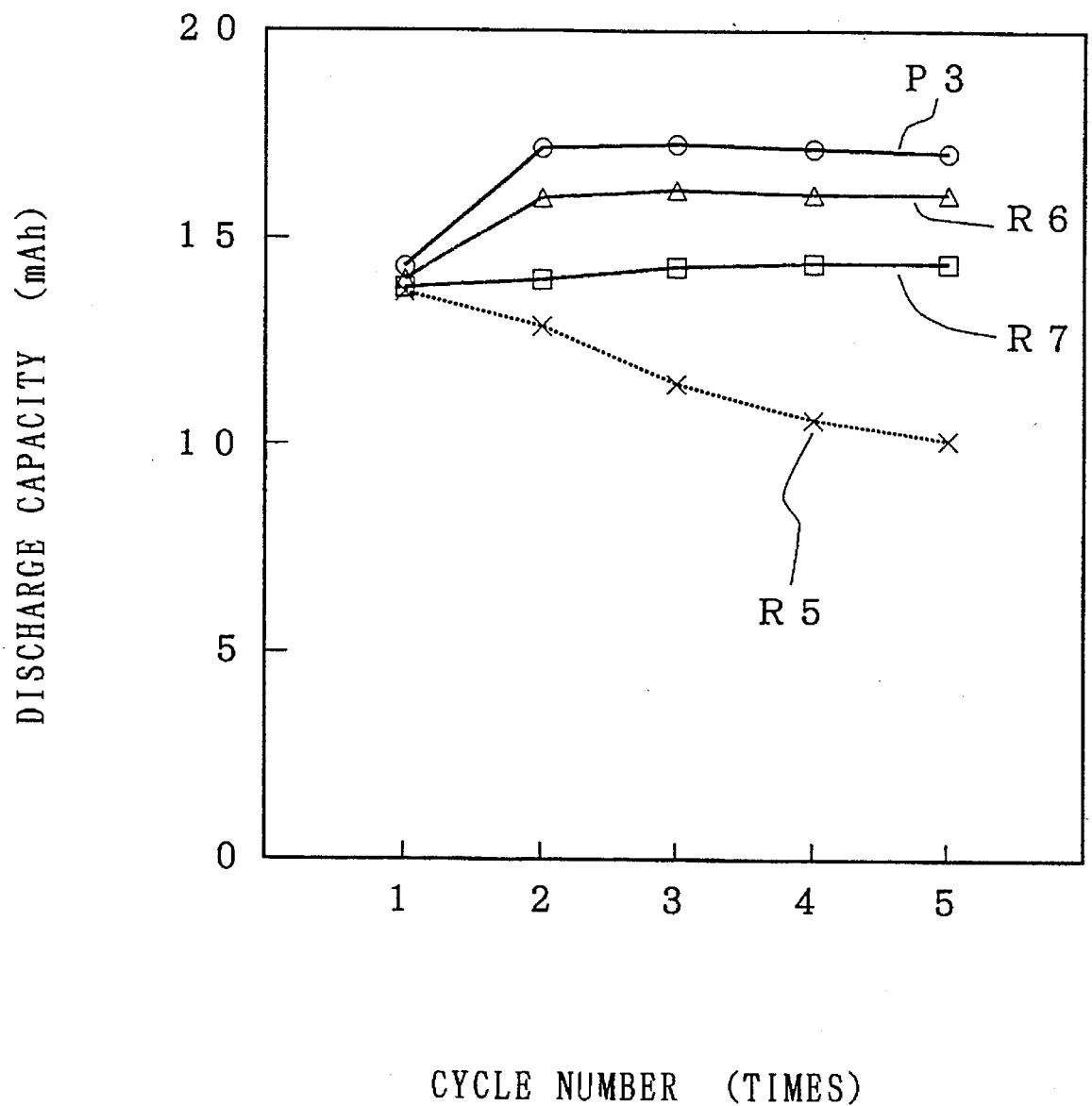
FIG. 4 is a graph comparing the cycle characteristics of batteries in which positive electrode active materials containing B and Si are and are not used.

These batteries were also put through 1 mA fixed-current charge/discharge cycles the same as those described in connection with the first preferred embodiment. Their discharge capacities (cycle characteristics) in successive cycles are shown in FIG. 4. As is clear from FIG. 4, in this preferred embodiment also the battery P3 according to the invention had markedly greater discharge capacity than and superior charge/discharge characteristics to the comparison battery R7 in which a positive electrode active material containing only Si as a compounding element was used, the comparison battery R6 in which a positive electrode active material containing only boron B was used and the comparison battery R5 in which an active material containing neither Si nor boron B was used.

Fourth Preferred Embodiment

This preferred embodiment is a case where cobalt Co was used as a transition metal element M, boron B as a compounding element R and carbon C, zinc Zn and titanium Ti as compounding elements L constituting a positive electrode active material.

The positive electrode active material of this preferred embodiment was made in the following way: Lithium hydroxide $LiOH·H_2O$, boron oxide $B_2O_3$, the simple substance L or its compound and cobalt carbonate $CoCO_3$ were weighed out in the mole ratio Li:B:L:Co=1:0.1:0.1:0.8 and well mixed using a mortar; this mixture was then baked by heating for 12 hours in air at a temperature of 850° C., cooled, and ground to a powder of particle diameter of below 53 μm. By repeating this baking and grinding twice, a positive electrode active material $LiB_{0.1}L_{0.1}Co_{0.8}O_2$ according to the invention was synthesized.

In this thermal synthesis, as the supply material (starting material) of the compounding element L, in the cases where L was C, Zn and Ti, graphite, zinc carbonate $ZnCO_3$ and titanium dioxide $TiO_2$ were respectively used. The $LiB_{0.1}C_{0.1}Co_{0.8}O_2$ (hereinafter abbreviated to p4), $LiB_{0.1}Zn_{0.1}Co_{0.8}O_2$ (hereinafter called p5) and $LiB_{0.1}Ti_{0.1}Co_{0.8}O_2$ (hereinafter called p6) thus obtained were used as positive electrode active materials.

Using these product materials as positive electrode active materials, batteries similar to those of the first preferred embodiment were made in exactly the same way as in the first preferred embodiment. The batteries thus produced will hereinafter be referred to as batteries P4 to P6 in correspondence with the positive electrode active materials p4 to p6 used therein.

Figure 5:
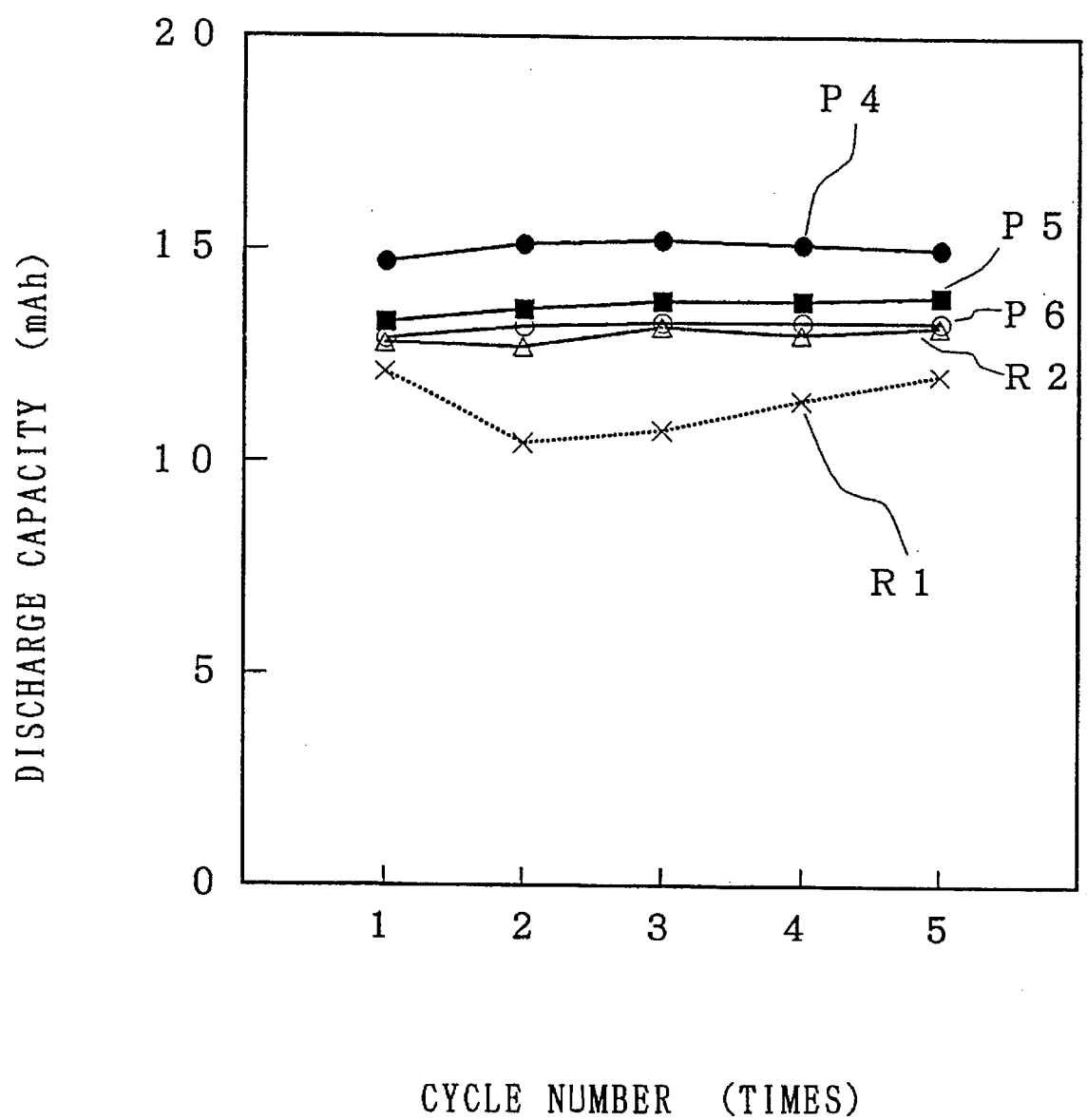
FIG. 5 is a graph comparing the cycle characteristics of batteries in which positive electrode active materials containing B and Zn, Ti or C are and are not used.

These batteries were also put through 1 mA fixed-current charge/discharge cycles the same as those described in connection with the first preferred embodiment. Their discharge capacities (cycle characteristics) in successive cycles are shown in FIG. 5 together with those of the comparison batteries R1 and R2 of the first preferred embodiment. As is clear from FIG. 5, in this preferred embodiment also the batteries P4 to P6 according to the invention all had greater discharge capacity and superior charge/discharge characteristics compared with the comparison battery R2 in which a positive electrode active material containing only B as a compounding element was used and the comparison battery R1 in which an active material containing neither an element L nor B was used.

Fifth Preferred Embodiment

This preferred embodiment is a case where nickel Ni and cobalt Co were used together as transition metal elements M and boron B was used as a compounding element R constituting a positive electrode active material.

The positive electrode active material of this preferred embodiment was made in the following way: Lithium hydroxide $LiOH·H_2O$, boron oxide $B_2O_3$, magnesium oxide MgO, nickel oxide NiO and cobalt carbonate $CoCO_3$ were weighed out in predetermined mole ratios Li:B:Mg:Ni:Co and mixed using a mortar; these mixtures were then baked by heating for 12 hours in air at a temperature of 850° C., cooled, and ground to powders of particle diameter of below 53 μm. This baking and grinding was repeated twice, and the materials obtained were used as positive electrode active materials.

In this preferred embodiment, two active materials, an active material p7 according to the invention wherein the mole ratio Li:B:Mg:Ni:Co was 1:0.1:0.1:0.4:0.4 ($LiB_{0.1}Mg_{0.1}Ni_{0.4}Co_{0.4}O_2$) and an active material p8 according to the invention wherein the mole ratio Li:B:Mg:Ni:Co was 1:0.1:0:0.45:0.45 ($LiB_{0.1}Ni_{0.45}Co_{0.45}O_2$), were made. Also, for comparison, a composite oxide $LiMg_{0.1}Ni_{0.45}Co_{0.45}O_2$ (comparison active material r8) not containing boron B but containing magnesium Mg, a nickel and cobalt composite oxide $LiNi_{0.5}Co_{0.5}O_2$ (comparison active material r9) containing neither boron B nor magnesium Mg, and a layer-like nickel oxide $LiNiO_2$ (comparison active material p10) were prepared in the following way: $LiOH·H_2O$, MgO, NiO and $CoCO_3$, or $LiOH·H_2O$, NiO and $CoCO_3$, or $LiOH·H_2O$ and NiO or the like were weighed out and mixed so that Li:Mg:Ni:Co, Li:Ni:Co or Li:Ni were in the mole ratios of the above-mentioned composition formulae, and comparison active materials r8 to r10 were obtained from these mixtures in the same way as the above-mentioned active materials p7 and p8.

Using these product materials as positive electrode active materials, batteries similar to those of the first preferred embodimentswere made in exactly the same way as in the first preferred embodiment. The batteries thus produced will hereinafter be referred to as batteries P7 and P8 and R8 to R10 in correspondence with the positive electrode active materials p7 and p8 and rS to r10 used therein.

Figure 6:
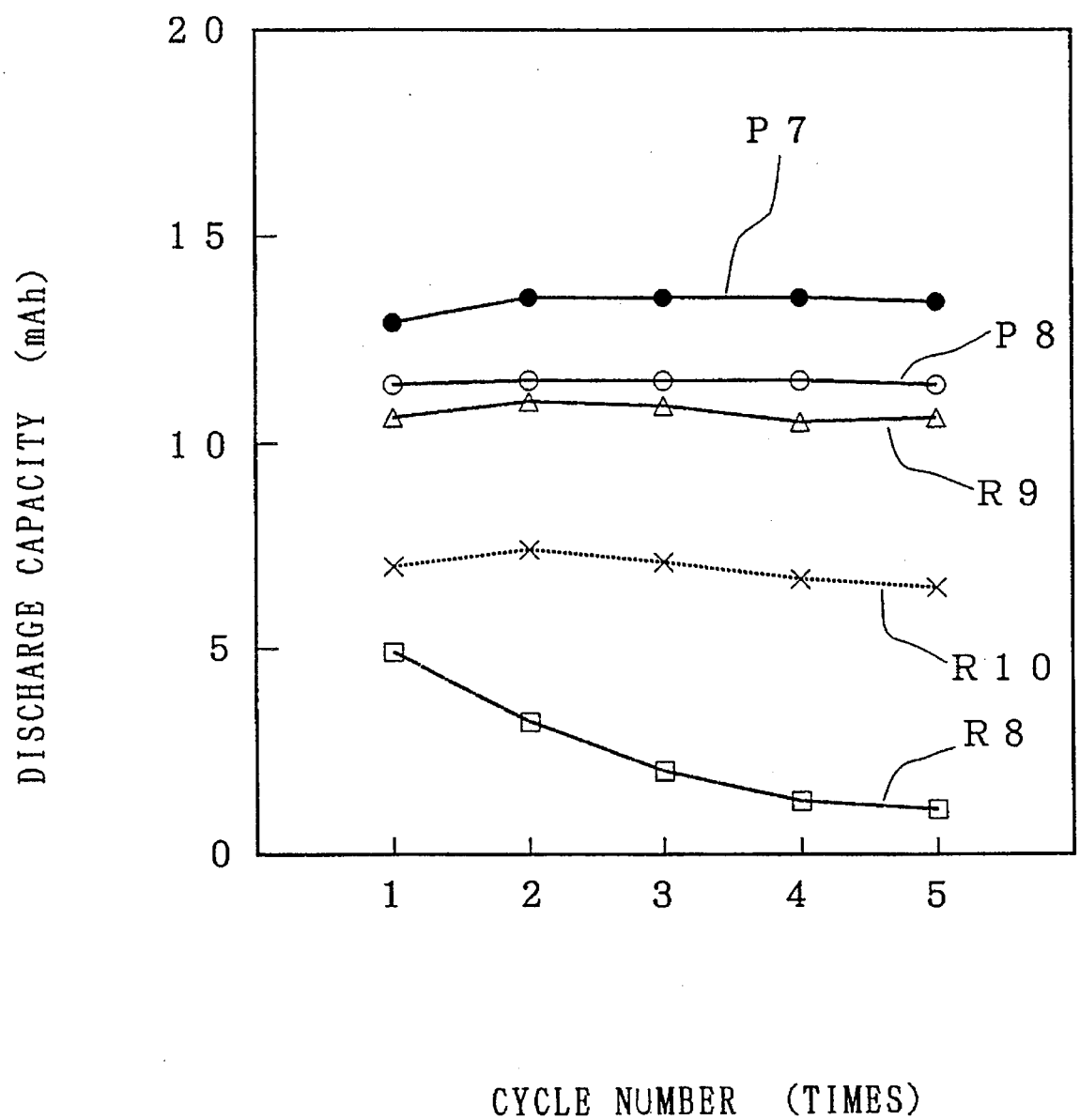
FIG. 6 is a graph comparing the cycle characteristics of batteries in which positive electrode active materials containing Ni and Co as transition metals M and containing B and Mg are and are not used.

These batteries were also put through 1 mAfixed-current charge/discharge cycles the same as those described in connection with the first preferred embodiment. Their discharge capacities (cycle characteristics) in successive cycles are shown in FIG. 6. As is clear from FIG. 6, the batteries P7 and P8 according to the invention both had greater discharge capacity and superior charge/discharge characteristics compared with the comparison batteries R8 to R10 in which positive electrode active materials containing no B were used. Also, it can be seen that the battery P7 containing both boron B and magnesium Mg had greater discharge capacity and showed superior charge/discharge characteristics compared with the battery P8 containing only boron B.

Sixth Preferred Embodiment

This preferred embodiment is a case where cobalt Co was used as a transition metal element M, silicon Si as a compounding element R and an alkali earth metal (magnesium Mg) as a compounding element L constituting a positive electrode active material.

A positive electrode of this preferred embodiment was made in the following way: Lithium hydroxide $LiOH.H_2O$, silicon dioxide $SiO_2$, magnesium oxide MgO and cobalt carbonate $CoCO_3$ were weighed out in the mole ratio Li:Si:Mg:Co=1:0.05:0.1:0.85 and well mixed using a mortar; this mixture was then baked by heating for 12 hours in air at a temperature of 850° C., cooled, and ground to a powder of particle diameter of below 53 μm. By repeating this baking and grinding twice, a positive electrode active material according to the invention having the approximate composition $LiSi_{0.05}Mg_{0.01}Co_{0.85}O_2$ (hereinafter abbreviated to p9) was synthesized. Also, for comparison, a conventional layer-like oxide $LiCoO_2$ (comparison active material r11) containing no Si or Mg, a composite oxide having the approximate composition $LiSi_{0.15}Co_{0.85}O_2$ (comparison active material r12) containing Si but not containing Mg, and a composite oxide having the approximate composition $LiMg_{0.15}Co_{0.85}O_2$ (comparison active material r13) containing Mg but not containing Si were prepared in the following way: $LiOH.H_2O$ and $CoCO_3$ or $LiOH^{19}H_2O$ and $CoCO_3$ and $SiO_2$ or MgO or the like were weighed out and mixed so that Li:Si:Mg:Co were in the mole ratios of the above-mentioned composition formulae, and comparison active materials r11 to r13 were obtained from these mixtures in the same way as the above-mentioned active material p9.

For each of these product materials, the product material as a positive electrode active material, graphite as a conductor and crosslinked acrylic acid resin or the like as a binding agent were mixed in the weight ratio 60:35:5 to produce a positive electrode mixture and a positive electrode 5 was made by pressure-molding this positive electrode mixture at 2 tons/cm² into a pellet of diameter 15 mm, thickness 0.5 mm. After that, the positive electrode 5 thus obtained was adhered to and thereby integrated with a positive electrode case 7 using a positive electrode collector 6 made of a conducting resin adhesive with carbon as a conducting filler, and this was dried by reducedpressure heating at 200° C. for 10 hours to form the positive electrode structure of the battery described above.

Using these product materials as positive electrode active materials, batteries similar to those of the first preferred embodiment were made in exactly the same way as in the first preferred embodiment. The batteries thus produced will hereinafter be referred to as batteries P9 and R11 to R13 in correspondence with the positive electrode active materials p9 and r11 to r13 used therein.

Figure 7:
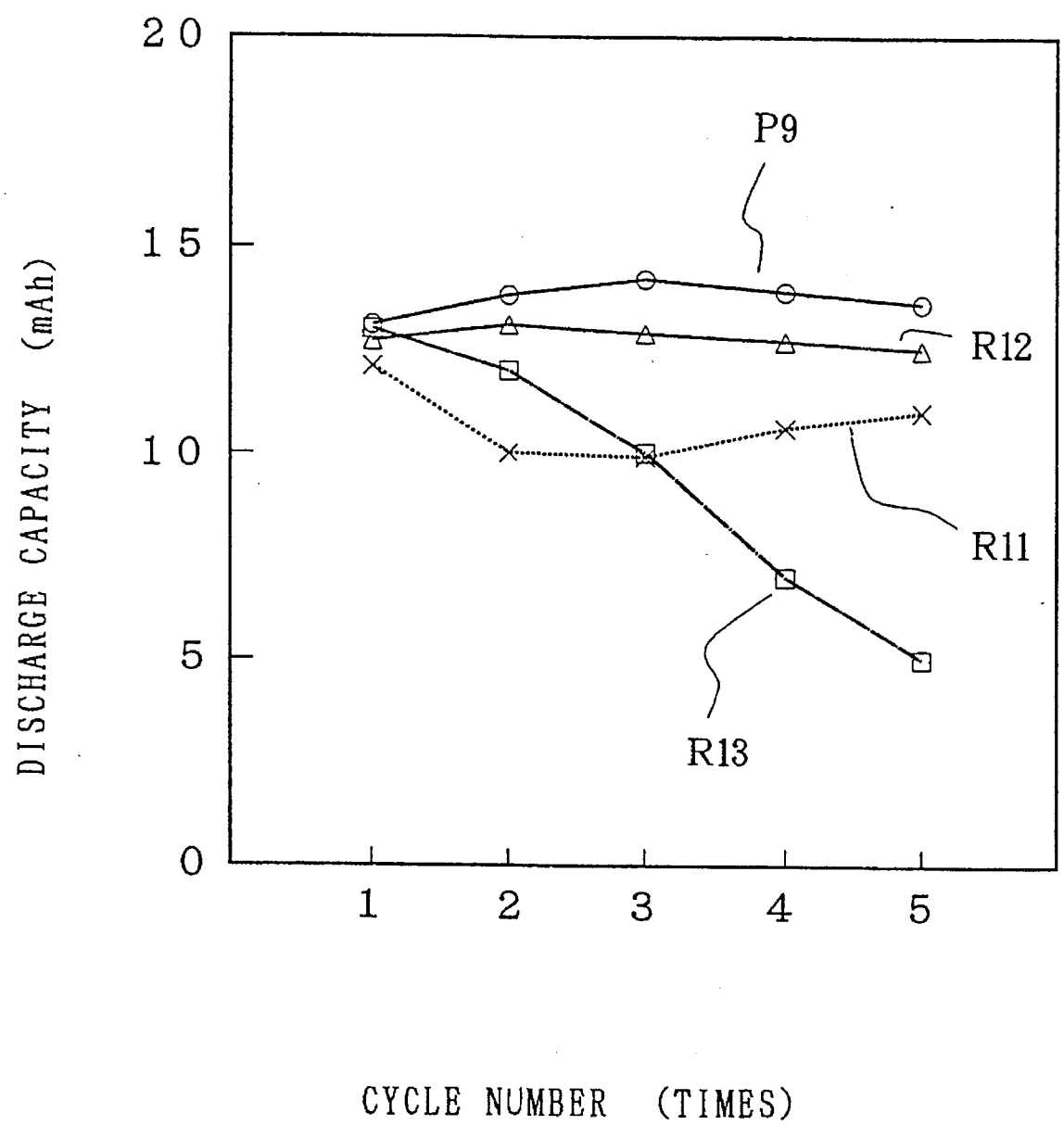
FIG. 7 is a graph comparing the cycle characteristics of batteries in which positive electrode active materials containing Si and Mg are and are not used.

These batteries were also put through 1 mA fixed-current charge/discharge cycles the same as those described in connection with the first preferred embodiment. Their discharge capacities (cycle characteristics) in successive cycles are shown in FIG. 7. As is clear from FIG. 7, the battery P9 according to the invention had markedly greater discharge capacity than the comparison batteries R11 to R13. Also, the reduction in discharge capacity (cycle deterioration) accompanying repeated charging and discharging was much smaller in the case of the battery P9 of the invention. Furthermore, from charge voltages and discharge voltages measured at the same time it was found that with the battery P9 of the invention although the charge voltage was low over the whole charge/discharge region the discharge operation voltage was reversely markedly high, the polarization (internal resistance) of the battery was greatly improved and high-current charging/discharging was easy.

Seventh Preferred Embodiment

This preferred embodiment is a case where nickel Ni and cobalt Co were used together as transition metal elements M and silicon Si was used as a compounding element R constituting a positive electrode active material.

A positive electrode active material of this preferred embodiment was made in the following way: Lithium hydroxide $LiOH.H_2O$, silicon dioxide $SiO_2$, nickel oxide NiO and cobalt carbonate $CoCO_3$ were weighed out in the mole ratio Li:Si:Ni:Co=1:0.1:0.2:0.7 and well mixed using a mortar; this mixture was then baked by heating for 12 hours in air at a temperature of 850° C., cooled, and ground to a powder of particle diameter of below 53 μm. By repeating this baking and grinding twice, a positive electrode active material according to the invention having the approximate composition $LiSi_{0.1}Ni_{0.2}Co_{0.7}O_2$ (hereinafter abbreviated to p10) was synthesized. Also, for comparison, a conventional composite oxide $LiNi_{0.2}Co_{0.8}O_2$ (comparison active material r14) not containing silicon was prepared in the following way: $LiOH.H_2O$, NiO and $CoCO_3$ were weighed out and mixed so that Li:Ni:Co were in the mole ratios of the above-mentioned composition formula, and a comparison active material r14 was obtained from this mixture in the same way as the above-mentioned active material p10.

Using these product materials as positive electrode active materials, batteries similar to those of the sixth preferred embodiment were made in exactly the same way as in the sixth preferred embodiment. The batteries thus produced will hereinafter be referred to as batteries P10 and R14 in correspondence with the positive electrode active materials p10 and r14 used therein.

Figure 8:
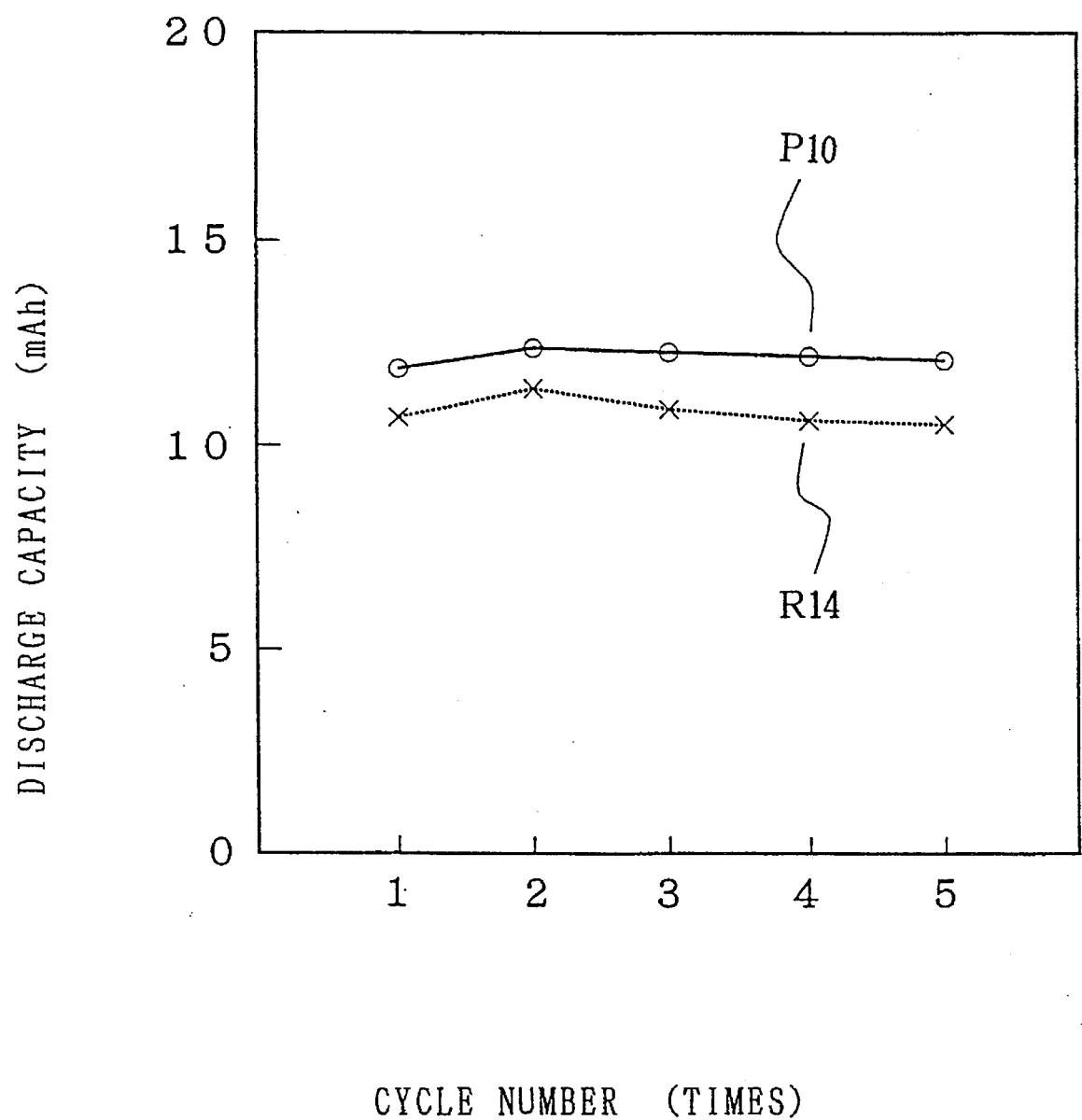
FIG. 8 is a graph comparing the cycle characteristics of batteries in which positive electrode active materials containing Ni and Co as transition metals M and containing Si are and are not used.

These batteries were also put through 1 mA fixed-current charge/discharge cycles the same as those described in connection with the first preferred embodiment. Their discharge capacities (cycle characteristics) in successive cycles are shown in FIG. 8. As is clear from FIG. 8, the battery P10 according to the invention had greater discharge capacity and superior charge/discharge characteristics compared with the comparison battery R14 in which a positive electrode active material containing no Si was used.

Eighth Preferred Embodiment

This preferred embodiment is a case where nickel Ni and cobalt Co were used together as transition metal elements M, Si is used as a compounding element R and Mg is used as a compounding element L constituting a positive electrode active material.

The positive electrode active material of this preferred embodiment was made in the following way: Lithium hydroxide $LiOH.H_2O$, silicon dioxide $SiO_2$, magnesium oxide MgO, nickel oxide NiO and cobalt carbonate $CoCO_3$ were weighed out in predetermined mole ratios Li:Si:Mg:Ni:Co and mixed using a mortar; these mixtures were then baked by heating for 12 hours in air at a temperature of 850° C., cooled, and ground to powders of particle diameter of below 53 μm. This baking and grinding was repeated twice, and the materials obtained were used as positive electrode active materials.

In this preferred embodiment, two active materials, an active material p11 according to the invention wherein the mole ratio Li:Si:Mg:Ni:Co was 1:0.05:0.25:0.35:0.35 (approximate composition $LiSi_{0.05}Mg_{0.25}Ni_{0.35}Co_{0.35}O_2$) and an active material p12 according to the invention not containing Mg wherein the mole ratio Li:Si:Mg:Ni:Co was 1:0.3:0:0.35:0.35 (approximate composition $LiSi_{0.3}Ni_{0.35}Co_{0.35}O_2$), were made. Also, for comparison, a composite oxide having the approximate composition $LiMg_{0.3}Ni_{0.35}Co_{0.35}O_2$ (comparison active material r15) not containing Si as a compounding element but containing magnesium Mg, a nickel and cobalt composite oxide $LiNi_{0.5}Co_{0.5}O_2$ (comparison active material r16) containing neither Si nor Mg, and a layer-like nickel oxide $LiNiO_2$ (comparison active material p17) were prepared in the following way: $LiOH \cdot H_2O$, MgO, NiO and $CoCO_3$, or $LiOH \cdot H_2O$, NiO and $CoCO_3$, or $LiOH \cdot H_2O$ and NiO or the like were weighed out and mixed so that Li:Mg:Ni:Co, Li:Ni:Co or Li:Ni were in the mole ratios of the above-mentioned composition formulae, and comparison active materials r15 to r17 were obtained from these mixtures in the same way as the above-mentioned active materials p11 and p12.

Using these product materials as positive electrode active materials, batteries similar to those of the sixth preferred embodiment were made in exactly the same way as in the sixth preferred embodiment. The batteries thus produced will hereinafter be referred to as batteries P11 and P12 and R15 to R17 in correspondence with the positive electrode active materials p11 and p12 and r15 to r17 used therein.

Figure 9:
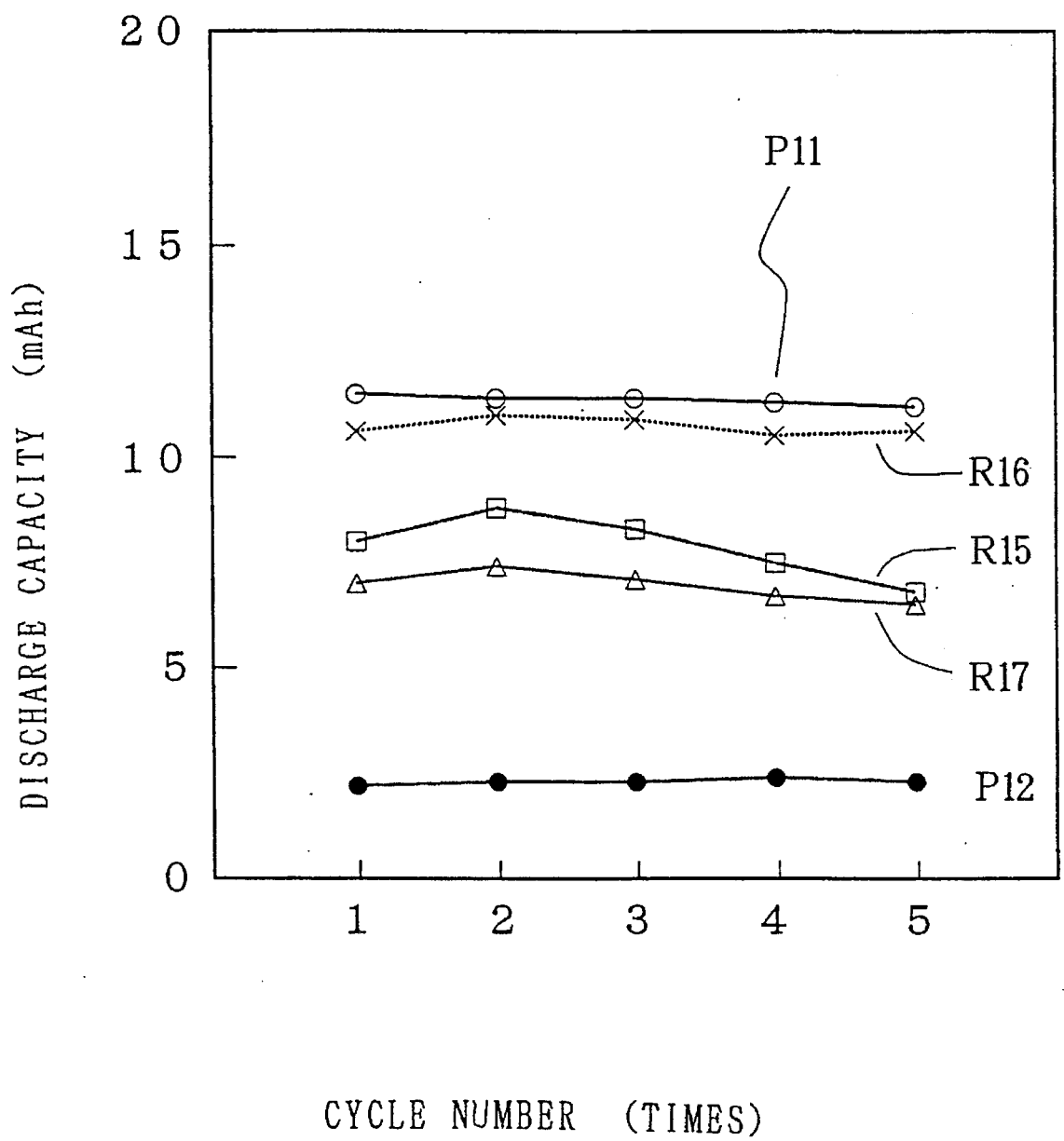
FIG. 9 is a graph comparing the cycle characteristics of batteries in which positive electrode active materials containing Ni and Co as transition metals M and containing Si and Mg are and are not used.

These batteries were also put through 1 mA fixed-current charge/discharge cycles the same as those described in connection with the first preferred embodiment. Their discharge capacities (cycle characteristics) in successive cycles are shown in FIG. 9. As is clear from FIG. 9, the battery P11 according to the invention in which an active material containing both Si and Mg was used had greater discharge capacity and superior charge/discharge characteristics compared with the comparison batteries R15 to R17 in which positive electrode active materials containing no Si were used and the battery P12 according to the invention in which an active material containing only Si was used. Also, it can be seen that the battery P12 in which an active material of Si content b=0.3 reversely has less discharge capacity than the battery R16 containing no Si, and in active material compositions such as those in this preferred embodiment wherein both Ni and Co are used together as compounding elements M, a silicon content of $0<b<0.3$ is preferable.

Ninth Preferred Embodiment

This preferred embodiment is a case where cobalt Co was used as a transition metal element M, silicon Si as a compounding element R and zinc Zn and manganese Mn as compounding elements L constituting a positive electrode active material.

The positive electrode active material of this preferred embodiment was made in the following way: Lithium hydroxide $LiOH \cdot H_2O$, silicon dioxide $SiO_2$, a carbonate or oxide of L and cobalt carbonate $CoCO_3$ were weighed out in the mole ratio Li:Si:L:Co=1:0.1:0.1:0.8 and well mixed using a mortar; this mixture was then baked by heating for 12 hours in air at a temperature of 850° C., cooled, and ground to a powder of particle diameter of below 53 μm. By repeating this baking and grinding twice, a positive electrode active material $LiSi_{0.1}L_{0.1}Co_{0.8}O_2$ according to the invention was synthesized.

In this thermal synthesis, as the supply material (starting material) of the compounding element L, in the cases where L was Zn and Mn, zinc carbonate $ZnCO_3$ and Manganese dioxide $MnO_2$, were respectively used. The composite oxides $LiSi_{0.1}Zn_{0.1}Co_{0.8}O_2$ (hereinafter abbreviated to p13) and $LiSi_{0.1}Mn_{0.1}Co_{0.8}O_2$ (hereinafter abbreviated to p14) thus obtained were used as positive electrode active materials.

Also, for comparison, a composite oxide having the approximate composition $LiSi_{0.2}Co_{0.8}O_2$ (comparison active material r18) containing Si but not containing a compounding element L was prepared in the following way: $LiOH \cdot H_2O$, $SiO_2$ and $CoCO_3$ were weighed out and mixed so that Li:Si:Co were in the mole ratio of the above-mentioned composition formula, and a comparison active material r18 was obtained from this mixture in the same way as the above-mentioned active materials p13 and p14.

Using these product materials as positive electrode active materials, batteries similar to those of the sixth preferred embodiment were made in exactly the same way as in the first preferred embodiment. The batteries thus produced will hereinafter be referred to as batteries P13 and P14 and R18 in correspondence with the positive electrode active materials p13 and p14 and r18 used therein.

Figure 10:
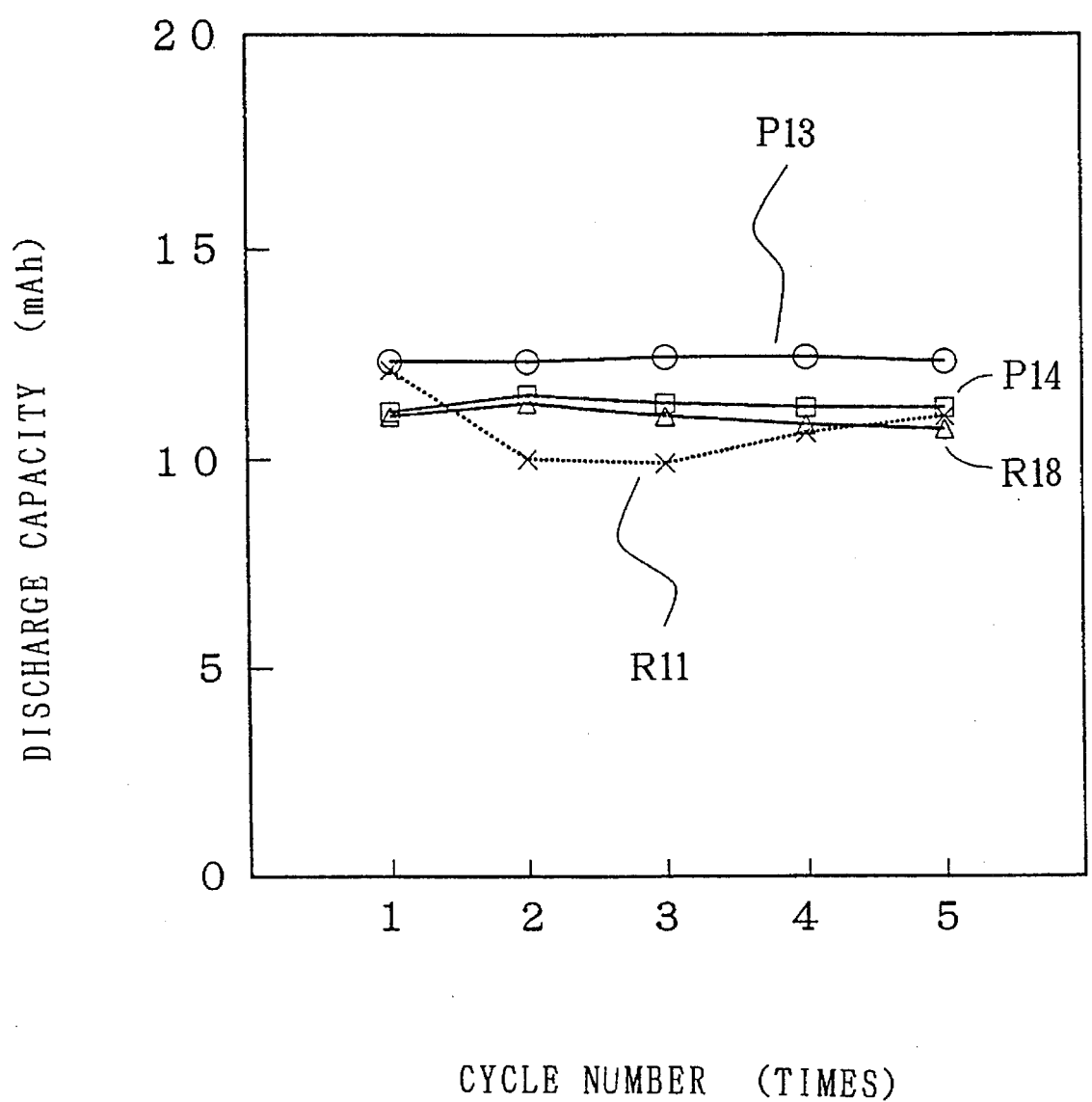
FIG. 10 is a graph comparing the cycle characteristics of batteries in which positive electrode active materials containing Zn or Mn together with Si are and are not used.

These batteries were also put through 1 mA fixed-current charge/discharge cycles the same as those described in connection with the first preferred embodiment. Their discharge capacities (cycle characteristics) in successive cycles are shown together with those of comparison battery R11 of the sixth preferred embodiment in FIG. 10. As is clear from FIG. 10, the batteries P13 and P14 according to the invention both had greater discharge capacity, smaller reduction in discharge capacity (cycle deterioration) accompanying repeated charging and discharging and therefore superior charge/discharge characteristics compared with the comparison battery R18 in which a positive electrode active material containing only Si as a compounding element was used and the battery R11 in which a positive electrode active material containing neither an element L nor Si was used.

Tenth Preferred Embodiment

This preferred embodiment is a case where nickel Ni was used as a transition metal element M, boron B or silicon Si as a compounding element R and Ti, Mn Cu, Zn or Mg as a compounding element L constituting a positive electrode active material, and the positive electrode active material is synthesized in an oxygen atmosphere.

The positive electrode active materials of this preferred embodiment were made in the following way: Lithium hydroxide $LiOH \cdot H_2O$, an oxide of the element R, an oxide or a carbonate of the element L and nickel oxide NiO were weighed out and mixed in the mole ratio Li:R:L:Ni= 1:0.025:0.025:0.95, and this mixture was then baked by heating for 6 hours in a flow of oxygen at a temperature of 700° C. After cooling, the baked mixture was ground to a powder of particle diameter of below 30 μm, and a positive electrode active material according to the invention having the approximate composition $LiR_{0.025}L_{0.025}Ni_{.95}O_2$ was thereby obtained.

In this thermal synthesis, as the supply material (starting material) of the compounding element R, $B_2O_3$ was used in the case where R was B and $SiO_2$ was used in the case where R was Si. As the supply material (starting material) of the compounding element L, in the cases where L was Ti, Mn, Cu, Zn and Mg, $TiO_2$, $MnO_2$, CuO, $ZnCO_3$ and MgO were respectively used. Composite oxides having the approximate constitutions $LiB_{0.025}Ti_{0.025}Ni_{0.95}O_2$ (hereinafter abbreviated to p15), $LiB_{0.025}Mn_{0.025}Ni_{0.95}O_2$ (p16), $LiB_{0.025}Cu_{0.025}Ni_{0.095}O_2$ (p17), $LiB_{0.025}Zn_{0.025}Ni_{0.95}O_2$ (p18), $LiB_{0.025}Mg_{0.025}Ni_{0.95}O_2$ (p19) and $LiSi_{0.025}Mg_{0.025}Ni_{0.95}O_2$ (p20) thus obtained were used as positive electrode active materials.

Also, for comparison, a conventional oxide $LiNiO_2$ (comparison active material r1g) containing neither B nor Si nor a compounding element L and a composite oxide having the approximate composition $LiB_{0.05}Ni_{0.95}O_2$ (comparison active material r20) containing B but not containing a compounding element L were prepared in the following way: $LiOH \cdot H_2O$ and NiO or $LiOH \cdot H_2O$ and $B_2O_3$ and NiO were weighed out and mixed so that Li:B:Ni were in the mole ratios of the above-mentioned composition formulae, and comparison active materials r19 and r20 were obtained from these mixtures in the same way as the above-mentioned active materials p15 to p20.

For each of these product materials, the product material as a positive electrode active material, graphite as a conductor and polyvinylidene fluoride or the like as a binding agent were mixed in the weight ratio 60:30:10 to produce a positive electrode mixture and a positive electrode was made by pressure-molding this positive electrode mixture at 2 tons/cm$^2$ into a pellet of diameter 8 mm, thickness 0.2 mm. After that, the positive electrode thus obtained was adhered to and thereby integrated with a positive electrode case 7 using a positive electrode collector 6 made of a conducting resin adhesive with carbon as a conducting filler, and this was dried by reduced-pressure heating at 100° C. for 10 hours to form a positive electrode.

For the negative electrode, instead of aluminum, a lithium foil disc of diameter 14 mm punched from a lithium foil of a prescribed thickness and directly adhered to the negative electrode collector 2 was used.

Apart from the use of these positive electrodes and this negative electrode, batteries similar to those of the first preferred embodiment were made in exactly the same way as in the first preferred embodiment. The batteries thus produced will hereinafter be referred toas batteries P15 to P20 and R19 and R20 in correspondence with the positive electrode active materials p15 to p20 and r19 and r20 used therein.

Figure 11:
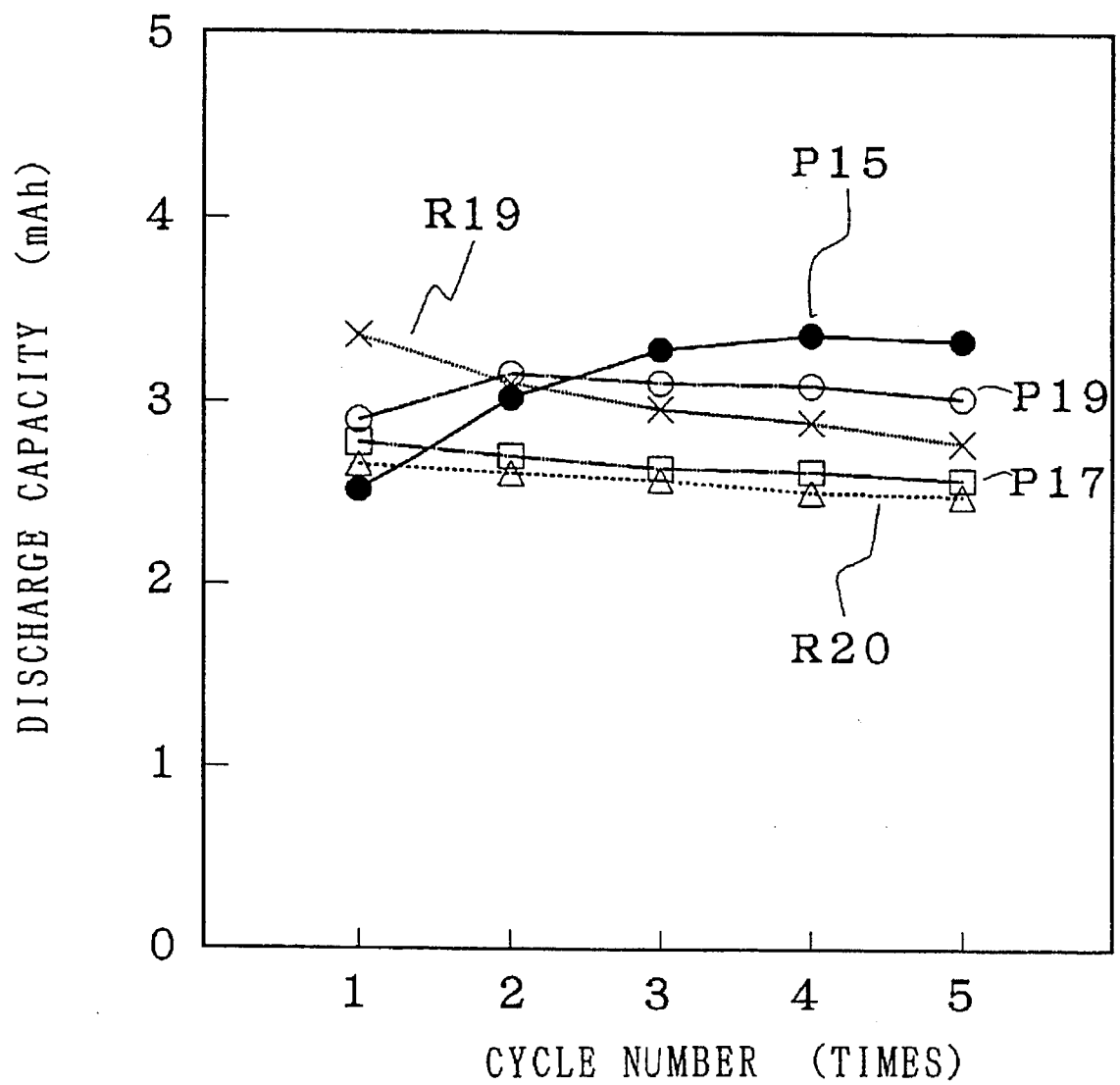
FIG. 11 is a graph comparing the cycle characteristics of batteries in which positive electrode active materials containing B and Ti, Cu or Mg are and are not used.

These batteries P15 to P20 and R19 and R20 were put through charge/discharge cycles with the conditions of a fixed current of 0.25 mA, a charging final voltage of 4.5V and a discharging final voltage of 2.5V. The ratios of the discharge capacity in the 5th cycle to the maximum discharge capacity up to the 5th cycle (the capacity retention rate) of each battery are shown in Table 1. The cycle characteristics of the batteries P15, P17, P19, R19 and R20 are shown in FIG. 11. The charge/discharge cycles started from charging. It can be seen from Table 1 and FIG. 11 that the batteries P15 to P20 according to the invention had greater capacity retention rates and superior cycle characteristics compared to the battery Ri9 in which $LiNiO_2$ was used as the positive electrode active layer and the battery R20 in which a positive electrode active containing only boron as a compounding element was used. In particular, in the cases of the composite oxides p15 and p19 containing Ti or Mg together with B, batteries with high discharge capacity and low cycle deterioration can be obtained. Also, in the case of the battery P17 in which a composite oxide containing Cu together with B was used, although the discharge capacity itself up to five cycles is smaller than that of the battery R19 in which $LiNiO_2$ was used, the capacity reduction accompanying repeated charging was small and the cycle characteristics were excellent.

TABLE 1

| Battery | Positive active material | Maintained capacity (%) |
|---|---|---|
| R19 | $LiNiO_2$ | 82.6 |
| R20 | $LiB_{0.05}Ni_{0.95}O_2$ | 93.4 |
| P15 | $LiB_{0.025}Ti_{0.025}Ni_{0.95}O_2$ | 99.0 |
| P16 | $LiB_{0.025}Mn_{0.025}Ni_{0.95}O_2$ | 95.5 |
| P18 | $LiB_{0.025}Zn_{0.025}Ni_{0.95}O_2$ | 99.3 |
| P19 | $LiB_{0.025}Mg_{0.025}Ni_{0.95}O_2$ | 95.9 |
| P20 | $LiSi_{0.025}Mg_{0.025}Ni_{0.95}O_2$ | 95.1 |

Eleventh Preferred Embodiment

This preferred embodiment is a case where mainly nickel Ni but also some Co was used as a transition metal element M and boron B as a compounding element R constituting a positive electrode active material.

The positive electrode active materials of this preferred embodiment were made in the following way: Lithium hydroxide $LiOH.H_2O$, $B_2O_3$, NiO and $Co_3O_4$ were weighed in predetermined mole ratios Li:B:Ni:Co and mixed and these mixtures were then baked by heating for 6 hours in an oxygen atmosphere at a temperature of 700° C. After cooling, the baked mixtures were ground to a powder of particle diameter of below 30 µm and used as positive electrode active materials.

In this preferred embodiment, two active materials, an active material p21 according to the invention wherein the mole ratio Li:B:Ni:Co was 1:0.03:0.87:0.1 ($LiB_{0.03}Ni_{0.87}Co_{0.10}O_2$) and an active material p22 according to the invention wherein the mole ratio Li:B:Ni:Co was 1:0.03:0.77:0.20 ($LiB_{0.03}Ni_{0.77}Co_{0.20}O_2$) were made. Also, for comparison, a composite oxide $LiB_{0.03}Ni_{0.97}O_2$ (comparison active material r21) containing B as a compounding element but not containing Co was made in the same way as p21 except that the above-mentioned starting materials were mixed in the mole ratio of the above-mentioned composition formula.

Apart from the use of these product materials as positive electrode active materials, batteries similar to those of the tenth preferred embodiment were made in exactly the same way as in the tenth preferred embodiment. The batteries thus produced will hereinafter be referred to as batteries P21 and P22 and R21 in correspondence with the positive electrode active materials p21 and p22 and r21 used therein.

Figure 12:
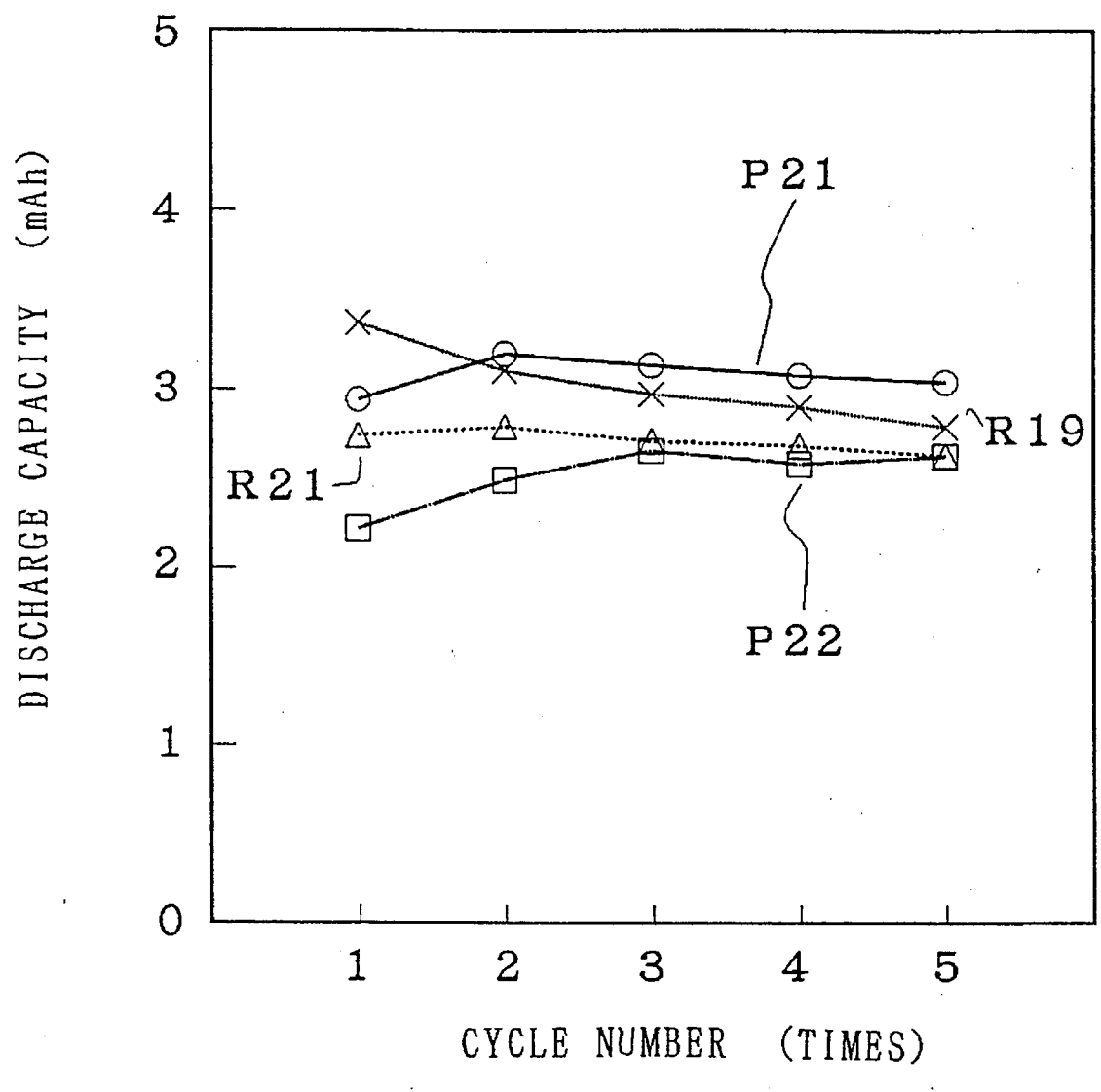
FIG. 12 is a graph comparing the cycle characteristics of batteries in which positive electrode active materials containing mainly Ni but also some Co as transition metals M and containing B are and are not used.

These batteries were also put through 0.25 mA fixed-current charge/discharge cycles the same as those described in the tenth preferred embodiment. Their discharge capacities (cycle characteristics) in successive cycles are shown in FIG. 12. As is clear from FIG. 12, the battery P21 according to the invention containing mainly Ni but also 10% Co as transition metals M and further containing B had greater discharge capacity and less cycle deterioration and therefore superior charge/discharge characteristics compared with the comparison battery R21 in which a positive electrode active material containing only B and not containing Co was used and the comparison battery R19 in which an active material containing neither Co nor B was used. Also, in the case of the battery P22 in which a positive electrode active material containing 20% Co together with B was used, although the discharge capacity up to five cycles is smaller than that of the comparison batteries R19 and R21, the capacity reduction accompanying repeated charging was smaller and the cycle characteristics were superior. That is, in an active material $Li_aR_bL_cNi_eCo_fO_2$ according to the invention containing mainly Ni but also some Co as transition metals M and also containing a compounding element R, the cycle deterioration is particularly low and the discharge characteristics are particularly good when $0.01 \leq b \leq 0.1$, $0 \leq c \leq 0.1$, $0.01 \leq b+c \leq 0.2$ and $0.03 \leq f/(e+f) \leq 0.25$.

In the preferred embodiments described above, only cases in which lithium-aluminum alloy or lithium was used as the negative electrode were described; however, the invention is not limited to such cases and can of course be similarly applied with any negative electrode made of a material capable of absorbing and releasing lithium, such as alloys of lithium and other metals such as Zn, Sn, Pb or Bi; carbon, silicon, lithium insertion compounds such as $Li_xMoO_2$, $Li_xWO_2$, $Li_xFe_2O_3$, $Li_xTiO_y$, $Li_xSnO_y$, $Li_xSiO_y$; and conducting polymers such as polyacetylene, polypyrol and polyacen which can be doped with Li ions.

Also, although only cases in which Co and Ni were used as transition metal elements M of the composite oxide $Li_aR_bL_cM_dO_2$ were described, the invention can be similarly applied based on the above description using other transition metals such as Cr, Fe, Mn and V.

As described in detail above, this invention is a non-aqueous electrolyte secondary battery in which is used as a positive electrode active material a new compound $Li_aR_bL_cM_dO_2$ (M being a transition metal) containing one or more metalloid elements R chosen from boron B and silicon Si and at least one metal or metalloid element L chosen from the group consisting of metals and metalloids of periodic table IIIA group and IVA group, alkali earth metals and metals selected from the group consisting of Ti, Mn, Cu and Zn; the use of this new positive electrode active material markedly increases the effective charge/discharge capacity, markedly improving the high-current charge/discharge characteristics of the battery and also markedly reduces the deterioration of discharge characteristics accompanying repeated charging and discharging. There are also various other benefits such as the merit that even when mainly Ni is used as the transition metal M synthesis in air is easy and atmosphere and temperature control during manufacture are therefore easy and manufacturing costs can be reduced.

What is claimed is:

1. A non-aqueous electrolyte secondary battery comprising: a negative electrode having an active material comprised of lithium or a material capable of absorbing and releasing lithium; a lithium ion conductive non-aqueous electrolyte; and a positive electrode having an active material comprised of a composite oxide represented by composition formula $Li_aR_bL_cM_dO_2$ where R is one or more metalloid elements selected from boron B and silicon Si, L is at least one element selected from among metals and metalloids of Groups IIIA and IVA of the periodic table, alkaline earth metals, and metals selected from the group consisting of Ti, Mn, Cu and Zn, M represents transition metal elements comprising at least Ni and Co, R, L and M are different, and a, b, c and d satisfy $0<a\leq1.15$, $0.85\leq b+c+d\leq1.3$, $0<b+c\leq0.5$, $0<b$ and $0\leq c$.

2. A non-aqueous electrolyte secondary battery according to claim 1; wherein the element L is one or more elements selected from the group consisting of Mg, C, Si, Ti, Mn, Cu and Zn.

3. A non-aqueous electrolyte secondary battery according to claims 1 or 2; wherein the transition metal M in composition formula $Li_aR_bL_cM_dO_2$ represents Ni and Co.

4. A non-aqueous electrolyte secondary battery according to claim 1 or 2; wherein the composite oxide of the positive electrode active material is represented by composition formula $Li_aR_bL_cNi_eCo_fO_2$ where a, b, c, e and f satisfy $0<a\leq1.15$, $0.85\leq b+c+e+f\leq1.3$, $0<b$, $0\leq c$, $0<b+c\leq0.5$, and $0.01\leq f/(e+f)\leq0.95$.

5. A non-aqueous electrolyte secondary battery according to claim 1 or 2; wherein the composite oxide of the positive electrode active material is represented by composition formula $Li_aR_bL_cNi_eCo_fO_2$ where a, b, c, e and f satisfy $0<a\leq1.15$, $0.85\leq b+c+e+f\leq1.3$, $0.01\leq b\leq0.25$, $0\leq c\leq0.25$, $0.01\leq b+c\leq0.5$, and $0.01\leq f/(e+f)\leq0.5$.

6. A non-aqueous electrolyte secondary battery according to claim 1 or 2; wherein the composite oxide of the positive electrode active material is represented by composition formula $Li_aR_bL_cNi_eCo_fO_2$ where a, b, c, e and f satisfy $0<a\leq1.15$, $0.85\leq b+c+e+f\leq1.3$, $0.01\leq b\leq0.1$, $0\leq c\leq0.1$, $0.01\leq b+c\leq0.2$, and $0.03\leq f/(e+f)\leq0.25$.

7. A positive active material for use in a secondary battery having a negative active material comprised of lithium or a material capable of absorbing and releasing lithium and a non-aqueous electrolyte capable of conducting lithium ions, the positive active material comprising: a composite oxide represented by composition formula $$Li_aR_bL_cM_dO_2 \qquad (1)$$

where R is one or more metalloid elements selected from boron B and silicon Si, L is at least one element selected from Groups IIIA and IVA of the periodic table, alkaline earth metals, and metals selected from the group consisting of Ti, Mn, Cu and Zn, M represents transition metal elements comprising at least Ni and Co, R, L and M are different and a, b, c and d satisfy $0<a\leq1.15$, $0.85\leq b+c+d\leq1.3$, $0<b+c\leq0.5$, $0<b$ and $0\leq c$.

8. A positive active material according to claim 7; wherein the element L constituting the composite oxide of formula (1) comprises one or more elements selected from the group consisting of Mg, C, Si, Ti, Mn, Cu and Zn.

9. A positive active material according to claim 8; wherein the composite oxide is represented by composition formula $Li_aR_bL_cNi_eCo_fO_2$ where a, b, c, e and f satisfy $0<a\leq1.15$, $0.85\leq b+c+e+f\leq1.3$, $0<b$, $0\leq c$, $0<b+c\leq0.5$ and $0.01\leq f/(e+f)\leq0.95$.

10. A positive active material according to claim 8; wherein the composite oxide is represented by composition formula $Li_aR_bL_cNi_eCo_fO_2$ where a, b, c, e and f satisfy $0<a\leq1.15$, $0.85\leq b+c+e+f\leq1.3$, $0.01\leq b+c\leq0.5$ and $0.01\leq f/(e+f)\leq0.5$.

11. A positive active material according to claim 8; wherein the composite oxide is represented by composition formula $Li_aR_bL_cNi_eCo_fO_2$ where a, b, c, e and f satisfy $0<a\leq1.15$, $0.85\leq b+c+e+f\leq1.3$, $0.01\leq b\leq0.1$, $0\leq c\leq0.1$, $0.01\leq b+c\leq0.2$ and $0.03\leq f/(e+f)\leq0.25$.

12. A positive active material according to claim 7; wherein the composite oxide is represented by composition formula $Li_aR_bL_cNi_eCo_fO_2$ where a, b, c, e and f satisfy $0<a\leq1.15$, $0.85\leq b+c+e+f\leq1.3$, $0<b$, $0\leq c$, $0<b+c\leq0.5$ and $0.01\leq f/(e+f)\leq0.95$.

13. A positive active material according to claim 7; wherein the composite oxide is represented by composition formula $Li_aR_bL_cNi_eCo_fO_2$ where a, b, c, e and f satisfy $0<a\leq1.15$, $0.85\leq b+c+e+f\leq1.3$, $0.01\leq b+c\leq0.5$ and $0.01\leq f/(e+f)\leq0.5$.

14. A positive active material according to claim 7; wherein the composite oxide is represented by composition formula $Li_aR_bL_cNi_eCo_fO_2$ where a, b, c, e and f satisfy $0<a\leq1.15$, $0.85\leq b+c+e+f\leq1.3$, $0.01\leq b\leq0.1$, $0\leq c\leq0.1$, $0.01\leq b+c\leq0.2$ and $0.03\leq f/(e+f)\leq0.25$.

\* \* \* \* \*